(12) United States Patent
Ishii et al.

(10) Patent No.: US 11,074,296 B2
(45) Date of Patent: Jul. 27, 2021

(54) QUERY GENERATION ASSIST METHOD AND QUERY GENERATION ASSIST APPARATUS

(71) Applicant: HITACHI, LTD., Tokyo (JP)

(72) Inventors: Yohsuke Ishii, Tokyo (JP); Yuuya Isoda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 372 days.

(21) Appl. No.: 16/125,195

(22) Filed: Sep. 7, 2018

(65) Prior Publication Data

US 2019/0228084 A1 Jul. 25, 2019

(30) Foreign Application Priority Data

Jan. 19, 2018 (JP) .............................. JP2018-006987

(51) Int. Cl.
| | |
|---|---|
| *H01L 29/08* | (2006.01) |
| *G06F 16/9032* | (2019.01) |
| *G06F 16/2455* | (2019.01) |
| *G06F 16/901* | (2019.01) |
| *G06F 16/2457* | (2019.01) |

(52) U.S. Cl.
CPC .... *G06F 16/90324* (2019.01); *G06F 16/2456* (2019.01); *G06F 16/24578* (2019.01); *G06F 16/9024* (2019.01)

(58) Field of Classification Search
CPC .......... G06F 16/90324; G06F 16/2456; G06F 16/24578; G06F 16/9024
USPC .......................................................... 257/40
See application file for complete search history.

(56) References Cited

U.S. PATENT DOCUMENTS

| | | | |
|---|---|---|---|
| 6,996,567 B2 * | 2/2006 | Ghukasyan | ........... G06F 16/217 |
| 7,546,306 B2 * | 6/2009 | Faerber | ............... G06F 16/2453 |
| 10,528,573 B1 * | 1/2020 | Darling | .............. H04N 21/4312 |

* cited by examiner

*Primary Examiner* — Ori Nadav
(74) *Attorney, Agent, or Firm* — Volpe Koenig

(57) ABSTRACT

To derive a query which can be joined and which gives non-zero pieces of data even if joined. A query generation assist method to assist generation of a query to extract data from a database includes: a first step of accepting, at the computer, a condition of extracting data to be acquired from the database as a data extraction condition; a second step of extracting, as graph data and at the computer, data which can be joined in data of the database; a third step of extracting subgraphs at the computer based on the data extraction condition from the graph data, and acquiring the subgraphs as query candidates; and a fourth step of calculating, at the computer, rank values of the query candidates and outputting the query candidates ranked according to the rank values.

4 Claims, 21 Drawing Sheets

FIG.4A

3100 REGION TABLE

| 3101 EFFECTIVE DATE AND TIME | 3102 REGION ID | 3103 REGION NUMBER | 3104 REGION NAME | ... |
|---|---|---|---|---|
| 2017/02/01 00:00:00 | 10001 | 1 | HOKKAIDO | |
| DITTO | 10002 | 2 | TOHOKU | |

FIG.4B

3200 FACTORY TABLE

| 3201 EFFECTIVE DATE AND TIME | 3202 FACTORY ID | 3203 FACTORY NAME | 3204 ADDRESS | ... |
|---|---|---|---|---|
| 2017/02/01 00:00:00 | 20001 | F1 | AAA | |
| DITTO | 20002 | F2 | BBB | |
| DITTO | 20003 | F3 | CCC | |

FIG.4C

3300 MANUFACTURING APPARATUS TABLE

| 3301 EFFECTIVE DATE AND TIME | 3302 MANUFACTURING APPARATUS ID | 3303 MANUFACTURING APPARATUS NAME | 3304 APPARATUS TYPE | ... |
|---|---|---|---|---|
| 2017/02/01 00:00:00 | 30001 | P1 | PPP | |
| DITTO | 30002 | P2 | QQQ | |
| DITTO | 30003 | P3 | RRR | |

FIG.4D

3400 SENSOR TABLE

| 3401 EFFECTIVE DATE AND TIME | 3402 SENSOR ID | 3403 SENSOR NAME | 3404 SENSOR TYPE | ... |
|---|---|---|---|---|
| 2017/02/01 00:00:00 | 40001 | S1 | TEMPERATURE | |
| DITTO | 40002 | S2 | TEMPERATURE | |
| DITTO | 40003 | S3 | WEIGHT | |
| DITTO | 40004 | S4 | WEIGHT | |
| DITTO | 40005 | S5 | WEIGHT | |

FIG.4E

3800 FACTORY-SENSOR TABLE

| EFFECTIVE DATE AND TIME (3801) | FACTORY ID (3802) | SENSOR ID (3803) |
|---|---|---|
| 2017/02/01 00:00:00 | 20001 | 40001 |
| DITTO | 20002 | 40002 |

FIG.4F

4000 MEASUREMENT VALUE TABLE

| DATE AND TIME (4001) | SENSOR ID (4002) | VALUE (4003) | ... |
|---|---|---|---|
| 2017/04/01 10:00:00 | 40001 | 25 | |
| DITTO | 40002 | 28 | |
| DITTO | 40003 | 100 | |
| DITTO | 40004 | 99 | |
| DITTO | 40005 | 102 | |
| ... | | | |

FIG.4G

3500 REGION-FACTORY TABLE

| EFFECTIVE DATE AND TIME (3501) | REGION ID (3502) | FACTORY ID (3503) |
|---|---|---|
| 2017/02/01 00:00:00 | 10001 | 20001 |
| DITTO | 10001 | 20002 |
| DITTO | 10002 | 20003 |

FIG.4H

3700 FACTORY-MANUFACTURING APPARATUS TABLE

| EFFECTIVE DATE AND TIME (3701) | FACTORY ID (3702) | MANUFACTURING APPARATUS ID (3703) |
|---|---|---|
| 2017/02/01 00:00:00 | 20001 | 30001 |
| DITTO | 20002 | 30002 |
| DITTO | 20003 | 30003 |

3600 REGION-SENSOR TABLE

| EFFECTIVE DATE AND TIME (3601) | REGION ID (3602) | SENSOR ID (3603) |
|---|---|---|
| 2017/02/01 00:00:00 | 10003 | 40003 |

3900 MANUFACTURING APPARATUS-SENSOR TABLE

| EFFECTIVE DATE AND TIME (3901) | MANUFACTURING APPARATUS ID (3902) | SENSOR ID (3903) |
|---|---|---|
| 2017/02/01 00:00:00 | 30001 | 40004 |
| DITTO | 30002 | 40005 |
| DITTO | 30003 | 40003 |

FIG.6

![Diagram 6100 showing data acquisition interface]

- 6100
- 6110 SAVE, 6120 STOP
- 6200 DATA ACQUISITION SCHEDULE
  - ACQUISITION INTERVAL 6210
  - START TIME 6220
  - 6210 (+), 6220 (−)
- 6300 DATA ACQUISITION TARGET
  - SERVER INFORMATION 6310
  - TABLE NAME 6320
  - ACQUISITION DATA TYPE 6330
  - 6370 (+), 6380 (−)
  - REFERENCE SOURCE ATTRIBUTE NAME 6340
  - REFERENCED TABLE NAME 6350
  - REFERENCED ATTRIBUTE NAME 6360

| 2110 | 2120 | 2130 |
|---|---|---|
| ID | ENTITY NAME | TABLE NAME |
| E1 | REGION | REGION TABLE |
| E2 | FACTORY | FACTORY TABLE |
| E3 | MANUFACTURING APPARATUS | MANUFACTURING APPARATUS TABLE |
| E4 | SENSOR | SENSOR TABLE |

FIG.8

| ID | FIRST ENTITY NAME | SECOND ENTITY NAME | FIRST TABLE NAME | SECOND TABLE NAME | JOIN CONDITION |
|---|---|---|---|---|---|
| R1 | REGION | FACTORY | REGION TABLE | FACTORY TABLE | T.1 EFFECTIVE DATE AND TIME = T2. EFFECTIVE DATE AND TIME AND T1. REGION ID = T2. FACTORY ID |
| R2 | FACTORY | MANUFACTURING APPARATUS | FACTORY TABLE | MANUFACTURING APPARATUS TABLE | T.1 EFFECTIVE DATE AND TIME = T2. EFFECTIVE DATE AND TIME AND T1. FACTORY ID = T2. MANUFACTURING APPARATUS ID |
| R3 | REGION | SENSOR | REGION TABLE | SENSOR TABLE | T.1 EFFECTIVE DATE AND TIME = T2. EFFECTIVE DATE AND TIME AND T1. REGION ID = T2. SENSOR ID |
| R4 | FACTORY | SENSOR | FACTORY TABLE | SENSOR TABLE | T.1 EFFECTIVE DATE AND TIME = T2. EFFECTIVE DATE AND TIME AND T1. FACTORY ID = T2. SENSOR ID |
| R5 | MANUFACTURING APPARATUS | SENSOR | MANUFACTURING APPARATUS TABLE | SENSOR TABLE | T.1 EFFECTIVE DATE AND TIME = T2. EFFECTIVE DATE AND TIME AND T1. MANUFACTURING APPARATUS ID = T2. SENSOR ID |
| R6 | SENSOR | MEASUREMENT VALUE | SENSOR TABLE | MEASUREMENT VALUE TABLE | T1. SENSOR ID = T2. SENSOR ID |

- 7200 EXTRACTION TARGET
  - 7210 ENTITY NAME
  - 7220 ATTRIBUTE NAME
  - 7110 EXECUTE (+) (−)
  - 7120 STOP
- 7300 SEARCH CONDITION
  - 7310 ENTITY NAME
  - 7320 ATTRIBUTE NAME
  - 7330 CONDITION
  - 7340 ATTRIBUTE VALUE
  - 7350 (+)
  - 7360 (−)
- 7400 EXTRACTION PERIOD
  - 7410 FROM
  - 7420 TO
  - 7430 (+)
  - 7440 (−)
- 7500 CANDIDATE DERIVATION CONDITION
  - 7510 TABLE COUNT
  - 7520 TOTAL JOIN COUNT
  - 7530 TOTAL ROUTE COUNT

RANKING METHOD 7600
REQUESTOR ID 7700

QUERY CANDIDATE COUNT : 6      (EVALUATION VALUE REGISTRATION) 8400

8200  8300

| # | RANK VALUE | TABLE COUNT | EXTRACTED INSTANCE LIST | EVALUATION VALUE INPUT | QUERY CONVERSION | QUERY JOIN ROUTE DISPLAY |
|---|---|---|---|---|---|---|
| | 8310 | 8320 | 8330 | 8340 | 8350 | 8360 / 8370 |
| 1 | 0.9 | 4 | S1,S2,S4,S5 | | SQL 8361 | LIST 8371 / GRAPH 8381 |
| 2 | 0.8 | 4 | S1,S2,S4,S5 | | SQL 8362 | LIST 8372 / GRAPH 8382 |
| 3 | 0.5 | 2 | S1,S2 | | SQL 8363 | LIST 8373 / GRAPH 8383 |
| 4 | 0.4 | 2 | S1,S2 | | SQL 8364 | LIST 8374 / GRAPH 8384 |
| 5 | 0.3 | 2 | S4,S5 | | SQL 8365 | LIST 8375 / GRAPH 8385 |
| 6 | 0.2 | 2 | S4,S5 | | SQL 8366 | LIST 8376 / GRAPH 8386 |

8570 LIST FORMAT OUTPUT SCREEN

| # | LIST | |
|---|---|---|
| 1 | ('e11:' REGION') → ('e12:' FACTORY') → ('e13:' SENSOR') <br> OR <br> ('e21:' REGION') → ('e22:' FACTORY') → ('e23:' MANUFACTURING APPARATUS') → ('e24:' SENSOR') | 8571 |
| 2 | ('e11:' REGION') → ('e12:' FACTORY') → ('e13:' SENSOR') <br> OR <br> ('e21:' REGION') → ('e22:' FACTORY') → ('e23:' MANUFACTURING APPARATUS') → ('e24:' SENSOR') | 8572 |
| 3 | ('e11:' REGION') → ('e13:' SENSOR') | 8573 |
| 4 | ('e11:' REGION') → ('e12:' FACTORY') → ('e13:' SENSOR') <br> OR <br> ('e21:' REGION') → ('e23:' SENSOR') | 8574 |
| 5 | ('e21:' REGION') → ('e22:' FACTORY') → ('e23:' MANUFACTURING APPARATUS') → ('e24:' SENSOR') | 8575 |
| 6 | ('e11:' REGION') → ('e22:' FACTORY') → ('e23:' MANUFACTURING APPARATUS') → ('e24:' SENSOR') | 8576 |

8561 SQL QUERY

```
SELECT
  Measurement.date
  , Measurement.ID
  , Measurement.value
FROM
(
  Area INNER JOIN Factory ON Area.ID = Factory.ID
       INNER JOIN Sensor ON Factory.ID = Sensor.ID
)
UNION ALL
(
  Area INNER JOIN Factory ON Area.ID = Factory.ID
       INNER JOIN ProductionEquipment ON Factory.ID = ProductionEquipment.ID
       INNER JOIN Sensor ON ProductionEquipment.ID = Sensor.ID
)
INNER JOIN Measurement ON Sensor.ID = Measurement.ID
WHERE
  Measurement.data BETWEEN '2017/01/01' AND '2017/03/31'
;
```

| # | REQUESTOR ID | ENTITY/RELATION ADMINISTRATION TABLE ENTRY ID | EVALUATION VALUE |
|---|---|---|---|
| 1 | 100 | E1 | +1 |
| 2 | 101 | R1 | +3 |
| 3 | 501 | R2 | −5 |

| # | NUMBER OF TARGET ENTITY INSTANCES WHICH ARE HITS OF SEARCH CONDITIONS | SEARCH CONDITION HIT RATIO | WEIGHT VALUE | EVALUATION VALUE | TOTAL JOIN COUNT | TOTAL ROUTE COUNT | TABLE COUNT | RANK VALUE | RANK |
|---|---|---|---|---|---|---|---|---|---|
| CANDIDATE 1 | 0 | 0 | 0.1 | 0 | 1 | 1 | 2 | 10020.5 | 7 |
| CANDIDATE 2 | 2 | 0.5 | 0.27 | 0 | 2 | 1 | 3 | 10537.3 | 5 |
| CANDIDATE 3 | 2 | 0.5 | 0.6 | 0 | 3 | 1 | 4 | 10570.3 | 3 |
| CANDIDATE 4 | 2 | 0.5 | 0.19 | 0 | 3 | 2 | 3 | 10524.3 | 6 |
| CANDIDATE 5 | 2 | 0.5 | 035 | 0 | 4 | 2 | 4 | 10540.3 | 4 |
| CANDIDATE 6 | 4 | 1.0 | 0.44 | 0 | 4 | 2 | 4 | 11049.3 | 1 |
| CANDIDATE 7 | 4 | 1.0 | 0.32 | 0 | 5 | 3 | 4 | 11035.6 | 2 |

FIG.21

7100 — 7110 EXECUTE  7120 STOP

7200 EXTRACTION TARGET | ENTITY NAME [7210] | ATTRIBUTE NAME [7220] | + [7230] − [7240]

7300 SEARCH CONDITION | ENTITY NAME [7310] | ATTRIBUTE NAME [7320] | CONDITION [7330] | ATTRIBUTE VALUE [7340] | + [7350] − [7360]

7400 EXTRACTION PERIOD | FROM [7410] | TO [7420] | + [7430] − [7440]

7500 CANDIDATE DERIVATION CONDITION | TABLE COUNT [7510] | TOTAL JOIN COUNT [7520] | TOTAL ROUTE COUNT [7530]

RANKING METHOD [ ] ~7600
REQUESTOR ID [ ] ~7700

QUERY CANDIDATE COUNT : 6        (EVALUATION VALUE REGISTRATION)
                        8200    8300                              8400

| # [8310] | RANK VALUE [8320] | TABLE COUNT [8330] | EXTRACTED INSTANCE LIST [8340] | EVALUATION VALUE INPUT [8350] | QUERY CONVERSION [8360] | QUERY JOIN ROUTE DISPLAY [8370] |
|---|---|---|---|---|---|---|
| 1 | 0.9 | 4 | S1,S2,S4,S5 | ☐ | SQL ~8361 / SQL+CACHE ~8391 | LIST ~8371 / GRAPH ~8381 |
| 2 | 0.8 | 4 | S1,S2,S4,S5 | ☐ | SQL ~8362 / SQL+CACHE ~8392 | LIST ~8372 / GRAPH ~8382 |
| 3 | 0.5 | 2 | S1,S2 | ☐ | SQL ~8363 / SQL+CACHE ~8393 | LIST ~8373 / GRAPH ~8383 |
| 4 | 0.4 | 2 | S1,S2 | ☐ | SQL ~8364 / SQL+CACHE ~8394 | LIST ~8374 / GRAPH ~8384 |
| 5 | 0.3 | 2 | S4,S5 | ☐ | SQL ~8365 / SQL+CACHE ~8395 | LIST ~8375 / GRAPH ~8385 |
| 6 | 0.2 | 2 | S4,S5 | ☐ | SQL ~8366 / SQL+CACHE ~8396 | LIST ~8376 / GRAPH ~8386 |

8100

QUERY GENERATION ASSIST METHOD AND QUERY GENERATION ASSIST APPARATUS

CLAIM OF PRIORITY

The present application claims priority from Japanese patent application JP 2018-006987 filed on Jan. 19, 2018, the content of which is hereby incorporated by reference into this application.

The present invention relates to a computer system including a database system for the purpose of data collection, accumulation and analysis.

BACKGROUND ART

In recent years, efforts have been started being made for analysis of business data used in a business system and for data use and utilization through use of results of the analysis. Use of data analysis results has been expected to bring solutions to current business problems and lead to creation of new services and new projects. Here, business data used in the business system is often stored and administered in a business database that is a component of the business system.

Data (business data and time-series data) necessary for conducting each type of business is stored in the business database. Data models of business data, that is, schema structures, attribute definitions or the like of tables storing the data are designed by data designers according to each type of business.

Time-series data is data that is generated as appropriate in fields. For example, the data corresponds to values obtained through measurement with business equipment and/or sensor apparatuses, sensor identification information and measurement dates and times. A person responsible for each type of business acquires target data from the business database through a business application and uses the data for the business. The data acquired here is based on a format defined by a data designer in advance.

In addition, besides use of data in normal business, atypical data analysis and/or medium to long term data analysis using data accumulated so far as target data are conducted in some cases. For the purpose of atypical analysis, medium to long term data analysis or the like, respective pieces of data of business databases are regularly transferred to an information system database (DWH: Data Ware House, for example) in some cases.

Use of an information system database enables a way of use specialized in analysis work, without influencing the performance aspect and/or operational aspect of business systems using business databases. Although the data model of an information system database should be designed separately according to the intended use of analysis, the data model of business data is often utilized because it is assumed that atypical analysis is to be conducted. It is difficult to narrow down extracted data only with time-series data in an information system database.

It is necessary for an analyst to narrow down target data by associating business data and time-series data with each other. That is, it is necessary to generate a query including table join conditions for extracting (or selecting) data matching desired conditions (SQL: Structure Query Language, if a relational database is used)

However, it is not always the case that analysts are well familiar with data models of business data. Because of this, analysts have no choice but to attempt to join business data together referring to an entity relation map (ER diagram) of the data model or the like.

However, the shortest join path found by an analyst is not always necessarily optimal, a plurality of join paths are obtained as candidates, data obtained as a join result does not meet requirements, and so on. Because of this, it is difficult to simply generate an SQL query for extracting desired data. Because it is a hard task to generate FROM parts and join conditions of data extracting SQL by trial and error, what matters in proceeding with data analysis is to be able to provide assistance for the task.

There is a technique disclosed in Specification of U.S. Pat. No. 6,996,567 as a method of listing up join graphs in a database based on schema definitions of data stored in a database. According to the technique of Specification of U.S. Pat. No. 6,996,567, join graphs showing the possibility of inter-table joins can be generated based on the schema definitions registered in a relational database, and used for derivation of optimal join paths at the time of table join.

CITATION LIST

Patent Literature

Patent Literature 1: Specification of U.S. Pat. No. 6,996,567

SUMMARY

Nevertheless, in the technique of Specification of U.S. Pat. No. 6,996,567, actual relation data is not referenced in generation of join graphs. Because of this, even if actual tables are joined, there can be cases where the number of data extraction results becomes zero.

In addition, in the abovementioned Specification of U.S. Pat. No. 6,996,567, if there are a plurality of join route candidates among tables, data for a user to make decisions about selection from the plurality of candidates is not provided, and furthermore results of evaluation by a user (information indicating whether or not the candidates are suited for a user) are not reflected in derivation of the candidates. Because of this, it is difficult for a user to select one from the plurality of join route candidates. In addition, it has been difficult to re-organize and provide the plurality of join route candidates based on a result of evaluation by a user if there are such a plurality of join route candidates.

For these reasons, according to conventional techniques, if there are a plurality of join route candidates among tables and additionally data obtained through the join result is not necessarily one that matches requirements of a user, it has been difficult for a user to select an optimal one from the join route candidates.

The present invention was made in view of the abovementioned drawbacks, and an object of the present invention is to derive a query which can be joined and gives non-zero pieces of data even if joined.

The present invention is a query generation assist method to assist, at a computer having a processor and a memory, generation of a query to extract data from a database, the query generation assist method including: a first step of accepting, at the computer, a condition of extracting data to be acquired from the database as a data extraction condition; a second step of extracting, as graph data and at the computer, data which can be joined in data of the database; a third step of extracting subgraphs at the computer based on the data extraction condition from the graph data, and acquiring the subgraphs as query candidates; and a fourth step of calculating, at the computer, rank values of the query candidates and outputting the query candidates ranked according to the rank values.

Advantageous Effects of Invention

Accordingly, because a query candidate is derived in a database system based on subgraph data obtained through narrow-down using, as target data, graph data which can be joined according to schema definitions and for which relation data exists on a record level, a query which can be joined and gives non-zero pieces of data even if joined can be derived.

BRIEF DESCRIPTION OF THE DRAWINGS

FIG. 4A is a diagram showing the first embodiment of the present invention and showing one example of a region table registered in the database server;

FIG. 4B is a diagram showing the first embodiment of the present invention and showing one example of a factory table registered in the database server;

FIG. 4C is a diagram showing the first embodiment of the present invention and showing one example of a manufacturing apparatus table registered in the database server;

FIG. 4D is a diagram showing the first embodiment of the present invention and showing one example of a sensor table registered in the database server;

FIG. 4E is a diagram showing the first embodiment of the present invention and showing one example of a factory-sensor table registered in the database server;

FIG. 4F is a diagram showing the first embodiment of the present invention and showing one example of a measurement value table registered in the database server;

FIG. 4G is a diagram showing the first embodiment of the present invention and showing one example of a region-factory table registered in the database server;

FIG. 4H is a diagram showing the first embodiment of the present invention and showing one example of a factory-manufacturing apparatus table registered in the database server;

FIG. 6 is a diagram showing the first embodiment of the present invention and showing one example of a screen, at the database query deriving server, on which information about a schedule of acquiring data from the database server and an acquisition source thereof is input;

FIG. 7 is a diagram showing the first embodiment of the present invention and showing one example of an entity conversion table administered at the database query deriving server;

FIG. 8 is a diagram showing the first embodiment of the present invention and showing one example of a relation conversion table administered at the database query deriving server;

FIG. 10 is a diagram showing the first embodiment of the present invention and showing one example of a screen on which data extracting query candidate derivation results are output;

FIG. 11 is a diagram showing the first embodiment of the present invention and showing one example of a screen on which data extracting query candidates are output in a list format;

FIG. 13 is a diagram showing the first embodiment of the present invention and showing one example of an output screen showing SQL query conversion results about data extracting query candidates;

FIG. 14 is a diagram showing the first embodiment of the present invention and showing one example of an evaluation value table;

FIG. 17 is a diagram showing the first embodiment of the present invention and showing one example of a rank value table referenced in the data extracting query candidate derivation process;

FIG. 21 is a diagram showing the second embodiment of the present invention and showing one example of a screen on which results of derivation of data extracting query candidates are output.

DETAILED DESCRIPTION

Hereinafter, embodiments of the present invention are explained based on the attached drawings.

First Embodiment

Figure 1:
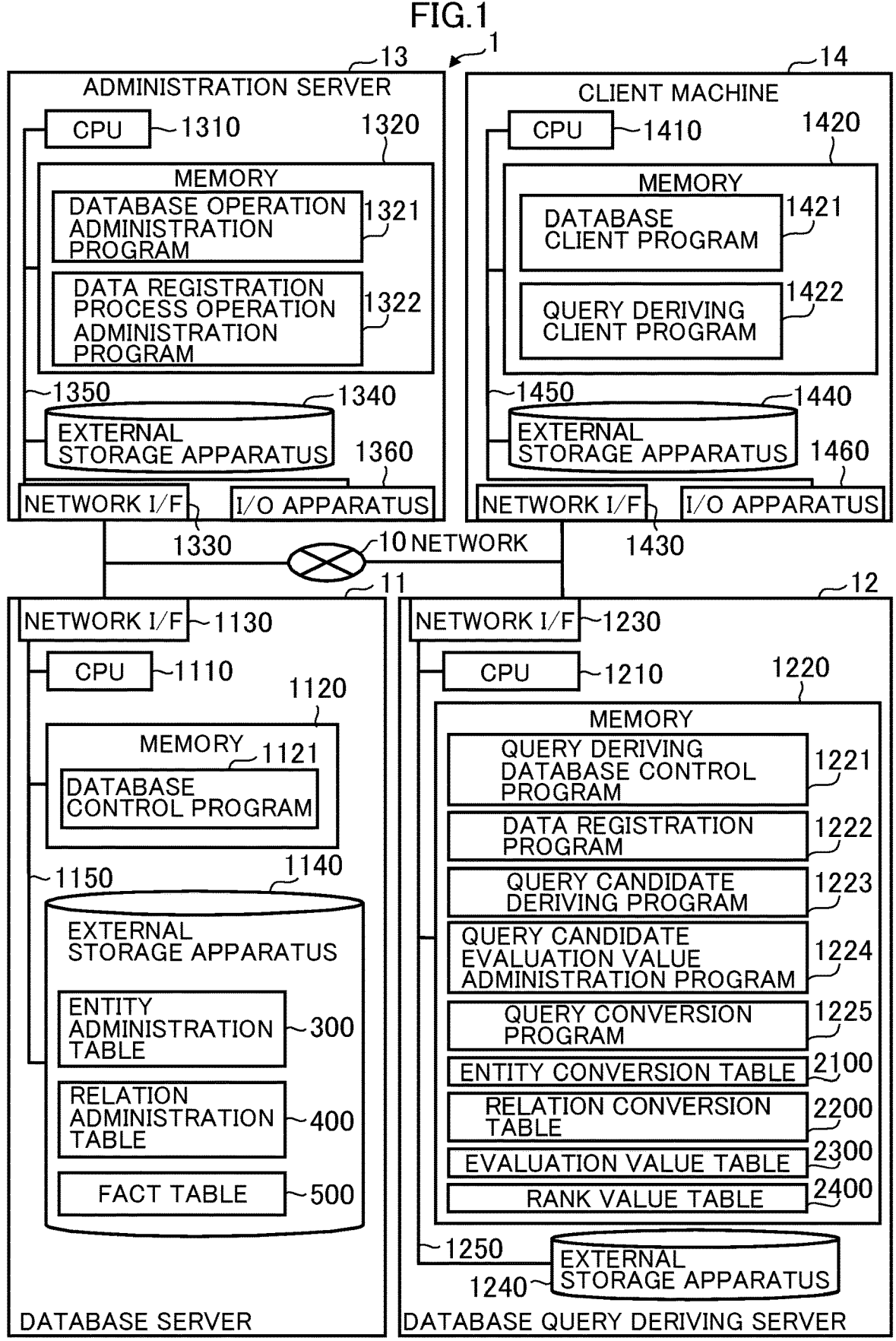
FIG. 1 is a block diagram showing first embodiment of the present invention and showing one example of the configuration of a computer system.

FIG. 1 is a block diagram showing the first embodiment of the present invention and showing one example of a computer system 1. The summary is explained.

The computer system 1 includes a database server 11, a database query deriving server 12, an administration server 13 and a client machine 14 which are mutually connected through a network 10 so that data communication is possible therebetween. The respective servers and the client machine 14 may each be configured as a plurality of apparatuses. In addition, they may be configured as one apparatus that serves a plurality of roles. For example, the database server and the database query deriving server may be realized as one apparatus or the database query deriving server 12 and the client machine 14 may be realized as one apparatus.

The database server 11 has the database function of accumulating and storing various types of data and providing corresponding data according to a request from the client machine 14 manipulated by a user. A general-purpose server apparatus is mainly applied as the database server 11, and the database server 11 includes a CPU 1110, a memory 1120, a network I/F 1130 that controls data communication with the network 10 and an external storage apparatus 1140 which are mutually connected by a bus 1150. A database control program 1121 is loaded onto the memory 1120 and is executed by the CPU 1110.

The database control program 1121 provides: a series of data processing control including data registration, update, read-out and deletion in the external storage apparatus 1140; and data administration control including data administration table generation and deletion, and schema definition generation and modification at a database.

In the present first embodiment, an example in which a database supporting SQL is used as this database control program 1121 is explained, but this is not the sole example. A database supporting NoSQL, a parallel database that operates in cooperation with a plurality of database servers, a distributed database or the like may also be used.

Entity administration tables 300, relation administration tables 400 and a FACT table 500 are stored in the external storage apparatus 1140. Note that contents of the respective tables are described below with reference to FIG. 3.

The database query deriving server 12 has the function of receiving an input of information about an extraction target data from the client machine 14 manipulated by a user of a database provided by the database server 11, and deriving and outputting a query available at the database server 11 based on the input information.

A general-purpose server apparatus is mainly applied as the database query deriving server 12, and the database query deriving server 12 includes a CPU 1210, a memory 1220, a network I/F 1230 that controls data communication with the network 10 and an external storage apparatus 1240 which are mutually connected by a bus 1250.

A query deriving database control program 1221, a data registration program 1222, a query candidate deriving program 1223, a query candidate evaluation value administration program 1224 and a query conversion program 1225 are loaded onto the memory 1220 and are executed by the CPU 1210.

In addition, an entity conversion table 2100, a relation conversion table 2200, an evaluation value table 2300 and a rank value table 2400 are kept in the memory 1220. Note that explanations of these administration tables are described below.

The CPU 1210 operates as a functional unit that provides a predetermined function by performing processes according to the respective programs. For example, the CPU 1210 functions as a query deriving database control program unit by performing processes according to the query deriving database control program 1221. The same applies to the other programs. Furthermore, the CPU 1210 also operates as a functional unit that provides the function of each of a plurality of processes executed by each program. A computer and a computer system are an apparatus and a system including these functional units.

Based on a data extraction condition or the like set at the client machine 14 manipulated by a user, from a plurality of groups of data administration tables at the database server 11, the query deriving database control program 1221 derives a query to select and join the table group as appropriate.

The query deriving database control program 1221 performs data processing control and data administration control necessary for providing a database that administers data in a format suitable for a process of deriving a query.

In the present first embodiment, an example in which a graph database supporting queries of OpenCypher is used for the query deriving database control program 1221 is explained, but this is not the sole example. Other graph databases may also be used, and databases other than them may also be used.

Use of graph databases enables definition of records registered in the groups of data administration tables at the database server 11 and the relationship among the records, and use of flexible queries based on graph structures easily enables visualization of the possibility of joins among tables or records using the relationship.

The data registration program 1222 provides processes of acquiring data to be used at the database query deriving server 12 from data stored in the database server 11 and registering the data in a query deriving database (illustration omitted). The processes performed at the data registration program 1222 consist of a crawling process on a database administered by the database server 11, a process of acquiring data from the database in the crawling process and a data registration process of registering the acquired data in a graph database.

The query candidate deriving program 1223 provides processes of using data administered by the query deriving database control program 1221 and deriving query candidates for acquiring data administered by the database control program 1121 on the database server 11.

The query candidate deriving program 1223 accepts, as an input, a data extraction condition from the client machine 14 manipulated by a user, derives a query intended for the query deriving database based on the condition and provides a result of execution of the query.

The query candidate deriving program 1223 calculates, for each query candidate, a rank value based on a predetermined ranking formula if a plurality of query candidates are derived, and provides a result of organizing (sorting) the query candidates based on the calculated rank values.

The query candidate evaluation value administration program 1224 makes it possible to set values of evaluation of respective query candidates at the client machine 14 manipulated by a user, for a query candidate group derived by the query candidate deriving program 1223.

The query candidate deriving program 1223 uses the evaluation values set at the client machine 14 in computation of the rank values using the ranking formula and provides a query candidate group based on a result of the computation. Thereby, it becomes possible to place a query candidate with a high evaluation value at a higher rank in an organized result based on values of evaluation by a user.

The query conversion program 1225 provides processes of selecting a desired query at the client machine 14 manipulated by a user from the query candidate group derived by the query candidate deriving program 1223, and, based on contents of the query, converting the query into a query available at the database control program 1121 on the database server 11.

The query conversion program 1225 performs, for example, conversion of a query in an OpenCypher format intended for the query deriving database into SQL intended for a relational database.

By using the converted query at the database control program 1121 on the database server 11, the client machine 14 manipulated by a user can acquire a group of data satisfying a data extraction condition input to the query candidate deriving program 1223.

The administration server 13 has the function of administering the operation of each function provided by the database server 11 and database query deriving server 12. A general-purpose server apparatus is mainly applied as the administration server 13, and the administration server 13 includes a CPU 1310, a memory 1320, a network I/F 1330 that controls data communication with the network 10, an external storage apparatus 1340 and an I/O apparatus 1360 which are mutually connected by a bus 1350.

A database operation administration program 1321 and a data registration process operation administration program 1322 are loaded onto the memory 1320 and executed by the CPU 1310.

The database operation administration program 1321 provides processes necessary for administration of the operation of databases including starting and stopping each database, expansion or reduction of data storage regions or addition or deletion of users. In the present first embodiment, an operation administration process intended for the database control program 1121 and an operation administration process intended for the query deriving database control program 1221 may be provided as separate functions or may be integrated into and provided as one function.

The data registration process operation administration program 1322 provides the function for setting information about a data registration target or a registration schedule for the data registration program 1222 on the database query deriving server 12.

The data registration program 1222 performs acquisition of target data and registration of the acquired data in a target database based on information set through the data registration process operation administration program 1322.

The I/O apparatus 1360 includes input apparatuses such as a mouse, a keyboard or a touch panel and output apparatuses such as a display.

The client machine 14 has the client function of using the database server 11 and database query deriving server 12. A general-purpose personal computer apparatus is mainly provided as the client machine 14, and similar to the server apparatuses, the client machine 14 includes a CPU 1410, a memory 1420, a network I/F 1430 that controls data communication with the network 10, an external storage apparatus 1440 and an I/O apparatus 1460 which are mutually connected by a bus 1450.

A database client program 1421 and a query deriving client program 1422 are loaded onto the memory 1420 and executed by the CPU 1410.

The database client program 1421 provides the client function for using the database control program 1121 on the database server 11. Specifically, it uses SQL to provide manipulation including data registration, update, acquisition and deletion on the database.

Note that the database client program 1421 may provide the client function for using the query deriving database control program 1221 on the database query deriving server 12. Specifically, it may use OpenCypher to provide manipulation on the database.

The query deriving client program 1422 provides the client function for using the query candidate deriving program 1223 on the database query deriving server 12. A user inputs a data extraction condition through the I/O apparatus 1460 and query deriving client program 1422. The query candidate deriving program 1223 derives and executes a query candidate intended for the query deriving database based on the data extraction condition and provides a result of it on a display of the I/O apparatus 1460.

Figure 2:
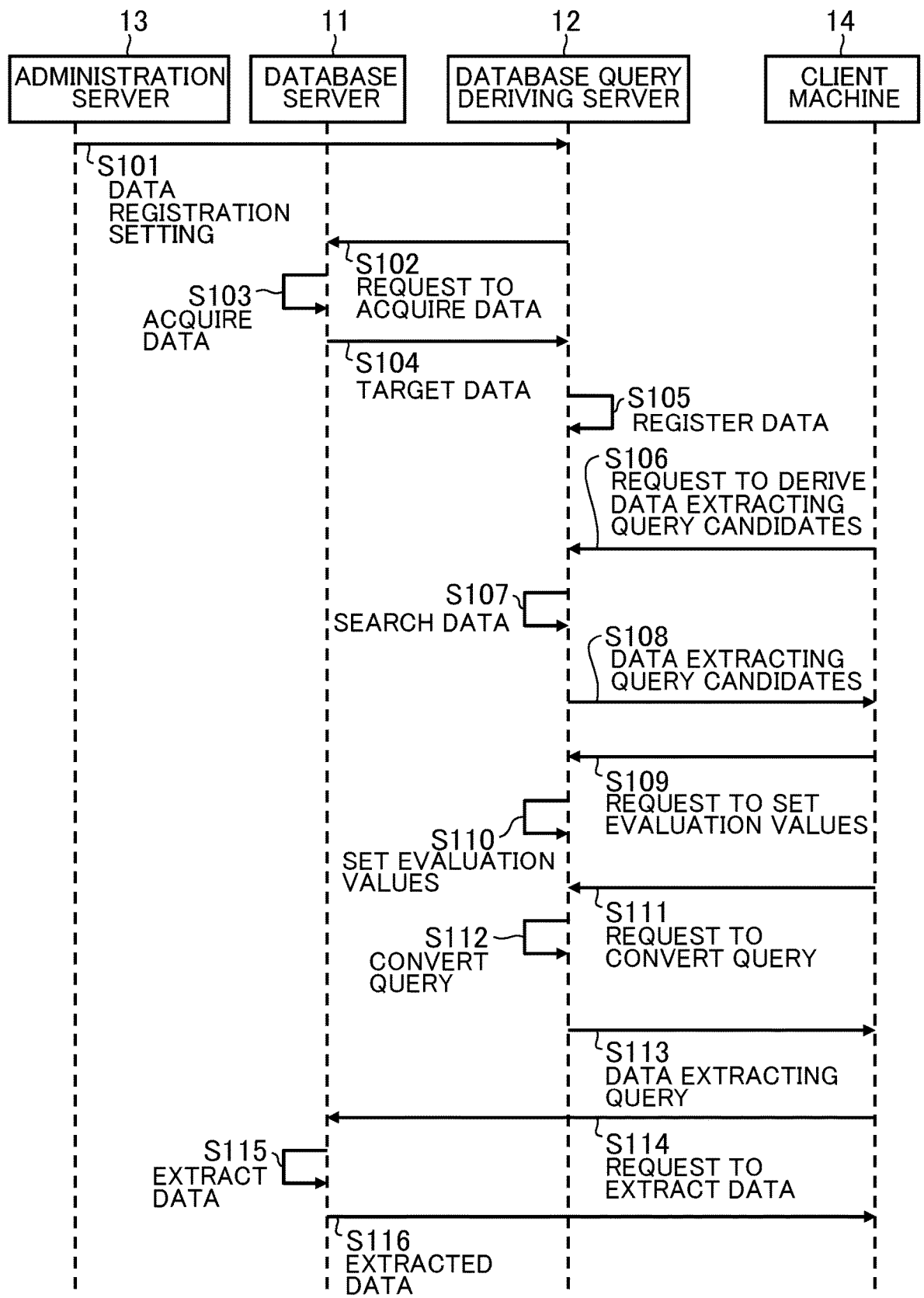
FIG. 2 is a sequence diagram showing a first embodiment of the present invention and showing a flow of a series of processes related to data extracting query generation.

A flow of a series of processes related to data extracting query generation in the present invention is explained using FIG. 2.

First, the data registration process operation administration program 1322 of the administration server 13 performs data registration setting for the data registration program 1222 of the database query deriving server 12 (S101).

The data registration program 1222 of the database query deriving server 12 requests the database control program 1121 of the database server 11 to acquire registration target data (S102). The database control program 1121 acquires the registration target data (S103), and provides the registration target data to the data registration program 1222, which is the requestor (S104). The data registration program 1222 registers the acquired data in the query deriving database (S105).

Next, through an I/O apparatus, a user uses the query deriving client program 1422 of the client machine 14 to designate a data extraction condition and demand the query candidate deriving program 1223 to derive data extracting query candidates (S106).

The query candidate deriving program 1223 of the database query deriving server 12 generates a query for the query deriving database based on the designated data extraction condition and searches for target data (S107), and derives data extracting query candidates. Then, the query candidate deriving program 1223 provides the derived data extracting query candidates to the query deriving client program 1422 (S108).

A user of the client machine 14 manipulates the I/O apparatus 1460 to use the query deriving client program 1422, and selects, from the provided data extracting query candidates, ones for which evaluation values are needed to be set for modifying an output rank at the time of displaying a result at the time of future query derivation.

The client machine 14 demands the query candidate evaluation value administration program 1224 of the database query deriving server 12 to set evaluation values for the selected data extracting query candidates (S109). The query candidate evaluation value administration program 1224 performs a process of setting the designated evaluation values to the designated data extracting query candidates (S110).

Next, a user of the client machine 14 manipulates the I/O apparatus 1460 to use the query deriving client program 1422, and selects, from the provided data extracting query candidates, data extracting query candidates that are available at the database server 11. Then, the query deriving client program 1422 demands the query conversion program 1225 of the database query deriving server 12 to convert the selected data extracting query candidates into queries available at the database server 11 (S111).

The query conversion program 1225 converts the selected data extracting query candidates into queries available at the database control program 1121 (SQL) (S112). Then, the query conversion program 1225 provides the data extracting queries obtained through the conversion to the query deriving client program 1422, which is the requestor (S113).

Thereby, the client machine 14 manipulated by a user can acquire the data extracting queries in the SQL format available at the database control program 1121 on the database server 11.

Last, the client machine 14 manipulated by a user uses the database client program 1421 to designate a data extracting query and requests the database control program 1121 to extract data (S114).

The database control program 1121 executes the designated data extracting query to extract target data (S115), and provides the extracted data to the database client program 1421, which is the requestor (S116). Thereby, the client machine 14 manipulated by a user can acquire the desired extracted data.

Figure 3:
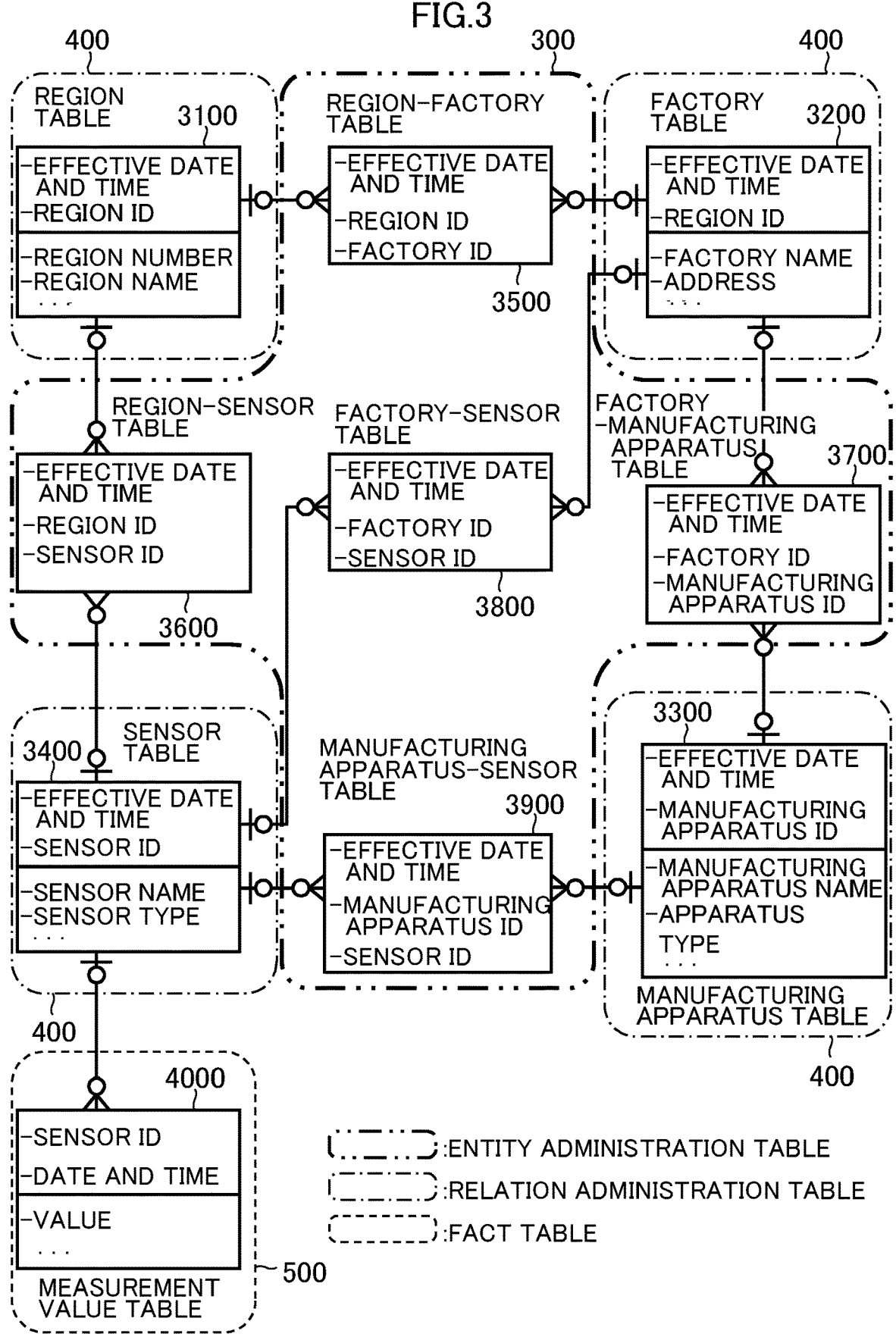
FIG. 3 is an ER (Entity relationship) diagram showing the first embodiment of the present invention and showing one example of data registered in a database server.

One example of an ER (Entity-relationship) diagram of data used in the first embodiment to which the present invention is applied is explained using FIG. 3. In the present first embodiment, an example is assumed, in which a plurality of manufacturing apparatuses to manufacture products are installed at a plurality of factories installed in a plurality of regions, a sensor apparatus is installed at each factory and in each manufacturing apparatus, and the database server 11 regularly acquires and records information about the factory and manufacturing apparatus.

The database server 11 is explained using a configuration example in which data handled by it is administered in: the entity administration tables 300 consisting of a region table 3100, a factory table 3200, a manufacturing apparatus table 3300 and a sensor table 3400; the relation administration tables (a region-factory table 3500, a region-sensor table 3600, a factory-manufacturing apparatus table 3700, a factory-sensor table 3800 and a manufacturing apparatus-sensor table 3900) 400 for administering relations among the entity administration tables 300; and a measurement value table 4000 for administering data measured by sensor apparatuses as the FACT table 500.

In the example shown, in the region table 3100, an effective date and time and a region ID serve as primary key attributes, and a region number, a region name and the like are administered as attributes. Here, the effective date and time attribute indicates the date and time on and at which the record became effective. By using this attribute, it becomes possible to specify a record that should be referenced on and at a predetermined date and time. This effective date and time attribute is used for the same purpose also in other tables.

Likewise, in the example shown, in the factory table 3200, an effective date and time and a factory ID serve as primary key attributes, and a factory name, an address and the like are administered as attributes. In the example shown, in the manufacturing apparatus table 3300, an effective date and time and a manufacturing apparatus ID serve as primary key attributes, and a manufacturing apparatus name, an apparatus type and the like are administered as attributes. In the example shown, in the sensor table 3400, an effective date and time and a sensor ID serve as primary key attributes, and a sensor name, a sensor type and the like are administered as attributes.

In the example shown, the region-factory table 3500 is a table in which a record defining the relationship between a record of the region table 3100 and a record of the factory table 3200 is administered, and an effective date and time, a region ID and a factory ID are administered as primary key attributes.

It is shown that in this region-factory table 3500, a many-to-many relationship can be defined between the region table 3100 and the factory table 3200, and there can be records between which relationships are not defined between one table and another table depending on records of the respective tables. This characteristic is a characteristic common to other relation administration tables 400 in the present first embodiment.

Likewise, in the example shown, in the region-sensor table 3600, an effective date and time, a region ID and a sensor ID are administered as primary key attributes. In the example shown, in the factory-manufacturing apparatus table 3700, an effective date and time, a factory ID and a manufacturing apparatus ID are administered as primary key attributes.

In the example shown, in the factory-sensor table 3800, an effective date and time, a factory ID and a sensor ID are administered as primary key attributes. In the example shown, in the manufacturing apparatus-sensor table 3900, an effective date and time, a manufacturing apparatus ID and a sensor ID are administered as primary key attributes.

In the example shown, in the measurement value table 4000, a sensor ID and a date and time serve as primary key attributes, and a value and the like are administered as attributes. The value attribute stores a value measured by a sensor. Here, it is shown that as the relationship between a record of the sensor table 3400 and a record of the measurement value table 4000, a zero or one-to-many relationship can be defined. This relationship can be defined using sensor IDs which are primary key attributes of both the tables.

Using FIG. 4A to FIG. 4J, one example of records of data used in the first embodiment to which the present invention is applied is explained. The database control program 1121 on the database server 11 generates and administers the entity administration tables 300 (the region table 3100, factory table 3200, manufacturing apparatus table 3300 and sensor table 3400), the relation administration tables 400 (the region-factory table 3500, region-sensor table 3600, factory-manufacturing apparatus table 3700, factory-sensor table 3800, manufacturing apparatus-sensor table 3900) and the measurement value table 4000 that were explained in FIG. 3.

FIG. 4A is a drawing showing one example of the region table 3100. The region table 3100 includes an effective date and time 3101, a region ID 3102, a region number 3103 and a region name 3104 in one record. The effective date and time 3101 is as described above, and in the region ID 3102 and region number 3103, values preset for each region name 3104 are stored.

FIG. 4B is a drawing showing one example of the factory table 3200. The factory table 3200 includes an effective date and time 3201, a factory ID 3202, a factory name 3203 and an address 3204 in one record. The effective date and time 3201 is as described above, and in the factory ID 3202, a value preset for each factory name 3203 is stored.

FIG. 4C is a drawing showing one example of the manufacturing apparatus table 3300. The manufacturing apparatus table 3300 includes an effective date and time 3301, a manufacturing apparatus ID 3302, a manufacturing apparatus name 3303 and an apparatus type 3304 in one record. The effective date and time 3301 is as described above, and in the manufacturing apparatus ID 3302, a value preset for each manufacturing apparatus name 3303 is stored. In the apparatus type 3304, the type of a corresponding apparatus is stored.

FIG. 4D is a drawing showing one example of the sensor table 3400. The sensor table 3400 includes an effective date and time 3401, a sensor ID 3402, a sensor name 3403 and a sensor type 3404 in one record. The effective date and time 3401 is as described above, and in the sensor ID 3402, a value preset for each sensor name 3403 is stored. In the sensor type 3404, the type of a corresponding sensor is stored.

FIG. 4E is a drawing showing one example of the factory-sensor table 3800. The factory-sensor table 3800 includes an effective date and time 3801, a factory ID 3802 and a sensor ID 3803 in one record. The effective date and time 3801 is as described above. In the factory ID 3802 and sensor ID 3803, an identifier of a factory and an identifier of a sensor located in the factory are stored.

FIG. 4F is a drawing showing one example of the measurement value table 4000. The measurement value table 4000 includes a date and time 4001, a sensor ID 4002 and a value 4003 in one record. In the date and time 4001, a date and time on and at which a sensor apparatus performed measurement is stored. In the sensor ID 4002, an identifier of the sensor apparatus is stored. In the value 4003, a value of data measured by the sensor apparatus is stored.

FIG. 4G is a drawing showing one example of the region-factory table 3500. The region-factory table 3500 includes an effective date and time 3501, a region ID 3502 and a factory ID 3503 in one record. The effective date and time 3501 is as described above. In the region ID 3502 and factory ID 3503, an identifier of a region and an identifier of a factory located in the region are stored.

FIG. 4H is a drawing showing one example of the factory-manufacturing apparatus table 3700. The factory-manufacturing apparatus table 3700 includes an effective date and time 3701, a factory ID 3702 and a manufacturing apparatus ID 3703 in one record. The effective date and time 3701 is as described above. In the factory ID 3702 and manufacturing apparatus ID 3703, an identifier of a factory and an identifier of a manufacturing apparatus located in the factory are stored.

Figures 4I, 4J, 5:
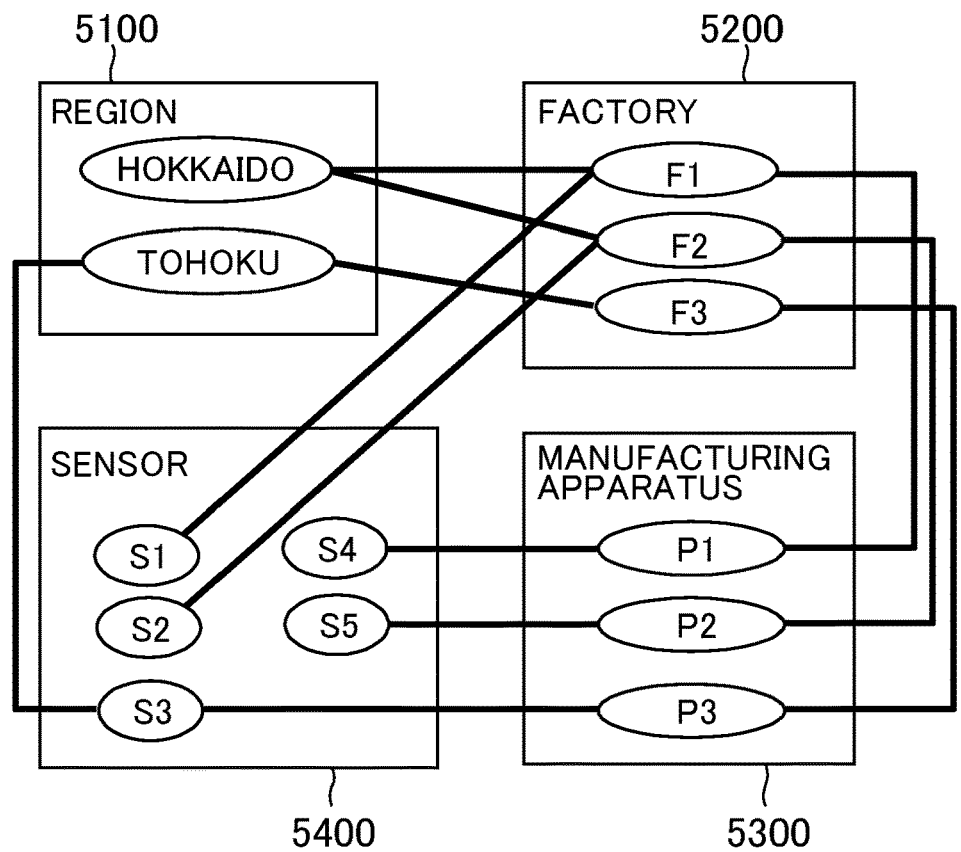
FIG. 4I is a diagram showing the first embodiment of the present invention and showing one example of a region-sensor table registered in the database server.
FIG. 4J is a diagram showing the first embodiment of the present invention and showing one example of a manufacturing apparatus-sensor table registered in the database server.
FIG. 5 is an entity/relation instance diagram showing the first embodiment of the present invention and explaining one example of data registered in a graph database of a database query deriving server.

FIG. 4I is a drawing showing one example of the region-sensor table 3600. The region-sensor table 3600 includes an effective date and time 3601, a region ID 3602 and a sensor ID 3603 in one record. The effective date and time 3601 is as described above. In the region ID 3602 and sensor ID 3603, an identifier of a region and an identifier of a sensor located in the region are stored.

FIG. 4J is a drawing showing one example of the manufacturing apparatus-sensor table 3900. The manufacturing apparatus-sensor table 3900 includes an effective date and time 3901, a manufacturing apparatus ID 3902 and a sensor ID 3903 in one record. The effective date and time 3901 is as described above. In the manufacturing apparatus ID 3902 and sensor ID 3903, an identifier of a manufacturing apparatus and an identifier of a sensor located in the manufacturing apparatus are stored.

FIG. 5 is used to show an example in which data used in the first embodiment to which the present invention is applied is handled in a graph database used as the query deriving database control program 1221.

The data handled as a target is the same as those explained in FIG. 3 and FIG. 4A to FIG. 4J. In the graph database, respective records stored in the entity administration tables 300 are administered as graph nodes including the table names as attributes.

In addition, records stored in the relation administration tables 400 are administered as graph edges connecting the graph nodes. Records stored in the measurement value table 4000 may be administered as graph nodes or may be excluded from administration targets.

Because the number of records to be registered in the measurement value table 4000 can be assumed to be huge, the volume of data in the graph database can be reduced by excluding them from administration targets.

FIG. 5 shows, as an example, how it appears when records registered in the region table 3100 are handled as graph nodes including region attributes 5100. Likewise, it shows, as an example, how it appears when records registered in the factory table 3200, manufacturing apparatus table 3300 and sensor table 3400 are handled as graph nodes including factory attributes 5200, manufacturing apparatus attributes 5300 and sensor attributes 5400, respectively.

In addition, it shows, as an example, how it appears when records registered in the region-factory table 3500 are handled as graph edges to connect graph nodes including the region attributes 5100 and graph nodes including the factory attributes 5200. Likewise, it shows, as an example, how it appears when records registered in the region-sensor table 3600, factory-manufacturing apparatus table 3700, factory-sensor table 3800, and manufacturing apparatus-sensor table 3900 are handled as graph edges to connect respectively corresponding graph nodes.

In the abovementioned conventional example, if sensors belonging to a region attribute 5100="Hokkaido" are to be acquired, because the relation definition is registered in the region-sensor table 3600, sensors belonging to the region attribute 5100="Hokkaido" are searched for by tracing the relation. Nevertheless, there is a drawback in the conventional example that because actual relation data is not referenced, sensors belonging to the region attribute 5100="Hokkaido" cannot be acquired by tracing the region-sensor table 3600.

The present first embodiment solves such a drawback in the manner described below, and derives a query to surely acquire data from graph data which can be joined.

FIG. 6 is a drawing schematically showing one example of a data registration screen 6100 output by the data registration program 1222 on the database query deriving server 12. The data registration screen 6100 accepts a schedule according to which data is acquired from the database server 11 and information about an acquisition source The data registration screen 6100 is displayed on the I/O apparatus 1360 of the administration server 13 through the network 10 and manipulated by a user (or an administrator) of the administration server 13

Note that although an example of an input and an output on the data registration screen 6100 is explained in the present first embodiment, this is not the sole example. Similar information may be able to be handled from commands, or similar information may be able to be handled as arguments or parameters of an API for executing the program.

On the data registration screen 6100, information about a data acquisition schedule 6200 and information about a data acquisition target 6300 can be input. The input information can be saved in the database query deriving server 12 by pressing a save button 6110, and manipulation of it can be stopped by pressing a stop button 6120.

About the data acquisition schedule 6200, an acquisition interval 6210 and a start time 6220 can be input. In the acquisition interval 6210, information is input to specify intervals of execution of data acquisition, such as every certain day of the week, every day or every hour. In the start time 6220, information is input to specify the start time in the schedule like 10:00 AM.

Note that about the data acquisition schedule 6200, it becomes possible to input a plurality of data acquisition schedules by pressing a "+" button 6230, and a desired data acquisition schedule can be deleted by pressing a "−" button 6240.

In the data acquisition target 6300, server information 6310, a table name 6320, an acquisition data type 6330, a reference source attribute name 6340, a referenced table name 6350 and a referenced attribute name 6360 can be input.

In the server information 6310, information is input to specify a server in which an acquisition target data is saved. The information to specify a server corresponds to a server name, an IP address or the like. In the table name 6320, information is input to specify a table to serve as an acquisition target from a table group administered at the database control program 1121 on the database server 11.

In the acquisition data type 6330, information is input to specify whether the table is an entity administration table 300 or a relation administration table 400. Here, if "entity administration table 300" is selected in the acquisition data type 6330, registration of a relational definition of a table attribute corresponding to the selected "entity administration table 300" with a predetermined attribute on another table is enabled.

In the present first embodiment, information to specify a reference source attribute defining a relationship in a reference source table is input to the reference source attribute name 6340. In addition, information to specify a referenced table for which a relationship is defined is input to the referenced table name 6350.

Information to specify an attribute of the referenced table for which the relationship is defined is input to the referenced attribute name 6360. Specifically, in the abovementioned example of data, if the sensor table 3400 is input as a data acquisition target, it is enabled to define a relationship between the sensor table 3400 and the measurement value table 4000.

In the present first embodiment, "sensor ID" is input to the reference source attribute name 6340, "measurement value table 4000" is input to the referenced table name 6350, and "sensor ID" is input to the referenced attribute name 6360. If the number of records in the measurement value table 4000 is large, and all the records of the table are registered in the query deriving database, the volume of data might also increase.

In view of this, by making it possible to input and administer the reference source attribute name 6340, referenced table name 6350 and referenced attribute name 6360, it becomes possible to administer a relationship between the sensor table 3400 and the measurement value table 4000 without registering records of the measurement value table 4000 in this data example in the query deriving database. Thereby, derivation of query candidates including the measurement value table 4000 becomes possible.

If "entity administration table 300" is selected in the acquisition data type 6330, input information is stored in the entity conversion table 2100. In addition, if "relation administration table 400" is selected, input information is stored in the relation conversion table 2200.

Note that about the data acquisition target 6300, it becomes possible to input a plurality of data acquisition schedules by pressing a "+" button 6370, and a desired data acquisition schedule can be deleted by pressing a "−" button 6380.

FIG. 7 schematically shows configuration information in the entity conversion table 2100. In the entity conversion table 2100, correspondence between graph nodes in the query deriving database and tables in the database control program 1121 is administered. In the entity conversion table 2100, information of IDs 2110 storing identifiers of entities, entity names 2120 and table names 2130 corresponding to the entity names is stored.

In the present first embodiment, if "entity administration table 300" is selected as the acquisition data type 6330 on the data registration screen 6100, input information is registered as records. A table name 6320 input as a data acquisition target is associated with a table name 2130 in the entity conversion table 2100.

In addition, in order to identify source tables when the record group of the table is generated as a graph node group in the graph database, an attribute value to be given as an attribute of a graph node is associated with an entity name 2120.

FIG. 8 schematically shows configuration information in the relation conversion table 2200. In the relation conversion table 2200, correspondence between graph edges in the query deriving database and tables used by the database control program 1121 operating in the database server 11 is administered.

In the relation conversion table 2200, information of an ID 2210, a first entity name 2220, a second entity name 2230, a first table name 2240, a second table name 2250 and a join condition 2260 are stored as one record.

In the present first embodiment, if "relation administration table" is selected as the acquisition data type 6330 on the data registration screen 6100 or if "entity administration table 300" is selected as the acquisition data type 6330 and additionally a reference source attribute name 6340, a referenced table name 6350 and a referenced attribute name 6360 are input on the data registration screen 6100, the input information is registered as a record in the relation conversion table 2200.

Two tables having a relationship defined by records of a table corresponding to the table name 6320 input as the data acquisition target 6300 are associated with the first table name 2240 and the second table name 2250, respectively.

In addition, in order to identify source tables when the record group of the table is generated as a graph edge group in the graph database, attribute values to be given as attributes of respective graph nodes sandwiching the graph edges are associated with first entity names 2220 and second entity names 2230, respectively.

A condition for the case where two tables with a first table name 2240 and a second table name 2250 are joined by the database control program 1121 is registered in the join condition 2260.

Figure 9:
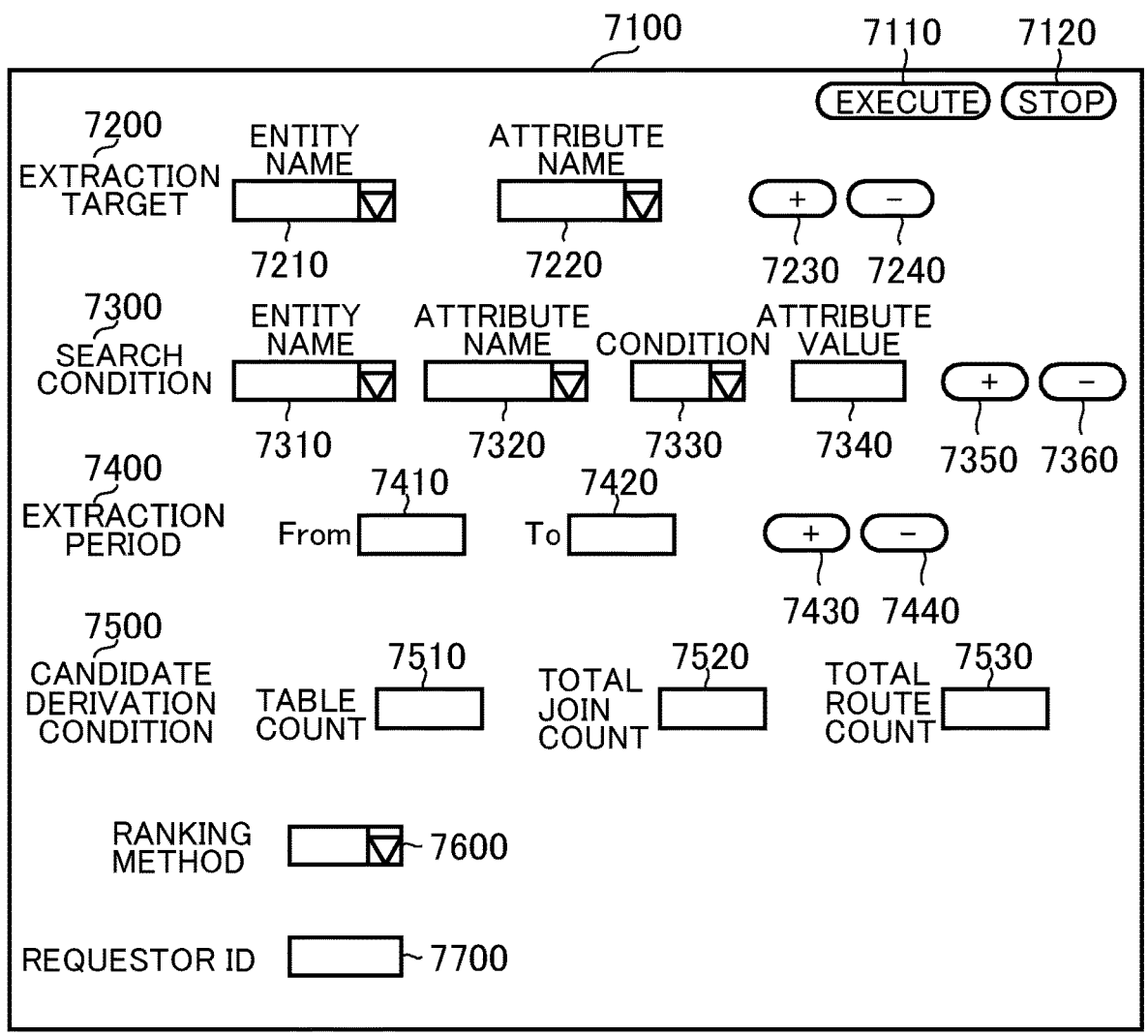
FIG. 9 is a diagram showing the first embodiment of the present invention and showing one example of a screen on which data extracting query derivation conditions are input.

FIG. 9 is a drawing schematically showing one example of a data extraction condition input screen 7100 output by the query candidate deriving program 1223 on the database query deriving server 12. The data extraction condition input screen 7100 is displayed on the I/O apparatus 1460 of the client machine 14 through the network 10 and manipulated by a user of the client machine 14.

Note that although an example of an input and an output on the screen is explained in the present embodiment, this is not the sole example. Similar information may be able to be handled from commands, or similar information may be able to be handled as arguments or parameters of an API for executing the program.

It is made possible to input, on the data extraction condition input screen 7100, information about a data extraction target 7200, information about a search condition 7300, information about an extraction period 7400, information about a candidate derivation condition 7500, information about a ranking method 7600 and information about a requestor ID 7700.

About the input information, manipulation execution (derivation of query candidates) can be requested to the query candidate deriving program 1223 by pressing an execute button 7110, and manipulation can be stopped by pressing a stop button 7120.

It is made possible to input, as the extraction target 7200, an entity name 7210 and an attribute name 7220. The information input here is equivalent to a SELECT part when a query is converted into SQL in the end. Note that about the extraction target 7200, it becomes possible to input a plurality of extraction targets by pressing a "+" button 7230, and a desired extraction target can be deleted by pressing a "−" button 7240.

It is made possible to input, as the search condition 7300, an entity name 7310, an attribute name 7320, a condition 7330 and an attribute value 7340 that are used in a search. The information input here is equivalent to a WHERE part when a query is converted into SQL in the end.

An attribute of a search target is determined based on input values of the entity name 7310 and attribute name 7320, and one having a value designated as the attribute value 7340 meeting a condition designated as the condition 7330 is provided as a search result.

It is made possible to designate, in the condition 7330, a condition such as that a value matches, does not match or partially matches or is larger or smaller. Note that about the search condition 7300, it becomes possible to input a plurality of search conditions by pressing a "+" button 7350, and a desired search condition can be deleted by pressing a "−" button 7360.

It is made possible to input, as the extraction period 7400, a from field 7410 into which a period start date and time is input, and a to field 7420 into which a period end date and time is input. The information input here is equivalent to a WHERE part when a query is converted into SQL in the end. Note that about the extraction period 7400, it becomes possible to input a plurality of extraction periods by pressing a "+" button 7430, and a desired extraction period can be deleted by pressing a "−" button 7440.

It is made possible to input, as the candidate derivation condition 7500, a table count 7510, a total join count 7520 and a total route count 7530. The table count 7510 designates the upper limit of the number of tables to be used by the database control program 1121 when a query is derived based on a data extraction condition. By determining the upper limit of the number of tables to be used, it becomes possible to perform control such that the I/O processing load does not become excessively high at the time of query execution.

In the total join count 7520, the upper limit of the number of times of joining tables to be used by the database control program 1211 (the number of times of performing JOIN) when a query is derived based on the data extraction condition is designated. By determining the upper limit of the number of times of join, it becomes possible to perform control such that the CPU processing load does not become excessively high at the time of query execution.

In the total route count 7530, the upper limit of the number of variations of routes for joining tables to be used by the database control program 1211 (the number of times of performing UNION or UNION ALL) when a query is derived based on the data extraction condition is designated. By determining the upper limit of the number of variations of routes, it becomes possible to perform control such that the number of processes or threads of parallel execution processing does not become excessively large at the time of query execution.

Note that although it is explained that it is made possible to input, as the candidate derivation condition 7500, the table count 7510, total join count 7520 and total route count 7530, this is not the sole example. It may be made possible to input values based on other indices that correspond to or can be converted into the I/O processing load, CPU processing load and number of parallel execution for a derived query. For example, the upper limit of an I/O size may be designated, the upper limit value of process time required for query execution may be designated, and/or the upper limit of the number of servers that can perform parallel distributed processing may be designated.

In the ranking method 7600, it is designated what criterion is used in organizing query candidates when a result is presented to a user if the result includes a plurality of query candidates matching the data extraction condition. For example, a query candidate with a larger number of corresponding instances may be ranked high, or a query candidate with a smaller number of necessary times of join (the number of times of JOIN) may be ranked high.

In the requestor ID 7600, information to specify a requestor (a user of the client machine 14) who input a data extraction condition is input. In the present first embodiment, it may be information to specify the individual requestor, may be information to specify a group to which the requestor belongs or may be information to specify a business or work that the requestor executes.

Note that in the present first embodiment, the extraction target 7200, search condition 7300 and extraction period 7400 are used as a data extraction condition, and the candidate derivation condition is used as a narrow-down condition.

FIG. 10 is a drawing schematically showing one example of a data extracting query candidate derivation result output screen 8100 output by the query candidate deriving program 1223 on the database query deriving server 12. The data extracting query candidate derivation result output screen 8100 is displayed on the I/O apparatus 1460 of the client machine 14 through the network 10 and manipulated by a user of the client machine 14.

Note that although an example of an input and an output on the screen is explained in the present embodiment, this is not the sole example. Similar information may be able to be handled from commands, or similar information may be able to be handled as arguments or parameters of an API for executing the program.

The data extracting query candidate derivation result output screen 8100 shows an example in which a result of execution of a process with the setting on the data extraction condition input screen 7100 is output under the screen (7100). On the data extracting query candidate derivation result output screen 8100, it is made possible to output a data extracting query candidate count 8200, a data extracting query candidate list 8300 and an evaluation value registration button 8400.

The data extracting query candidate count 8200 outputs the number of query candidates matching a data extraction condition input on the data extraction condition input screen 7100. The data extracting query candidate list 8300 outputs information of respective derived query candidates.

As specific output information of the data extracting query candidate list 8300, respective fields of output ranks 8310, rank values 8320, table counts 8330, extracted instance lists 8340, evaluation value input 8350, query conversion 8360 and query join route display 8370 are output.

As the output ranks 8310, the ranks of the entries in the data extracting query candidate list are output. In the rank values 8320, values calculated for determining output ranks in the data extracting query candidate list are output. These rank values 8320 are calculated according to a preset rank value computation formula. An explanation of the rank value computation formula is described below.

In the table counts 8330, the numbers of tables joined and referenced by query candidates of the entries are output. In the extracted instance lists 8340, lists of instances extracted under conditions designated in the extraction target 7200 with the query candidates of the entries are output.

In the evaluation value input 8350, fields into which values of evaluation by a user about the query candidates of the entries are input are displayed. The evaluation value input 8350 is described below. In the query conversion 8360, buttons for executing query conversion in a designated format about the query candidates of the entries are displayed. In the present first embodiment shown, SQL buttons 8361 to 8366 for performing query conversion into the SQL format are output. An explanation about these fields is described below.

In the query join route display 8370, buttons for displaying join routes of queries in a designated format about the query candidates of the entries are displayed. In the present first embodiment shown, graph buttons 8381 to 8386 for output in a graph format, and list buttons 8371 to 8376 for output in a list format are output. Note that the evaluation value registration button 8400 is described below.

FIG. 11 schematically shows a list format output screen 8570 to be displayed when the list buttons 8371 to 8376 in the query join route display 8370 fields are pressed on the data extracting query candidate derivation result output screen 8100. Note that although an example of an input and an output on the screen is explained in the present first embodiment, this is not the sole example. Similar information may be able to be handled from commands, or similar information may be able to be handled as arguments or parameters of an API for executing the program.

On the list format output screen 8570, information indicating graph nodes and graph edges corresponding to an entry of a corresponding query candidate are output in a list format. Specifically, by pressing the list button 8371 on the data extracting query candidate derivation result output screen 8100, list format information 8571 is output. Likewise, by pressing the list buttons 8372 to 8376, list format information 8572 to 8576 is output, respectively.

In the list format information 8571, information incorporating graph nodes and graph edges derived according to the query candidate is output based on a list representation in a graph database.

In the illustrated example, "(e11: 'region')" means a predetermined instance of a graph node generated from a record in the region table 3100, and "→" (arrow) means a predetermined instance of a graph edge defining a relationship between instances of graph nodes.

In addition, "OR" is used in the figure to list up a plurality of ways of tracing in the graph database. For example, it is shown that the list format information 8571 includes two routes. By using these manners of representation, it is possible to show which graph nodes and graph edges are traced to be able to trace desired graph edges with a corresponding query candidate.

Figure 12:
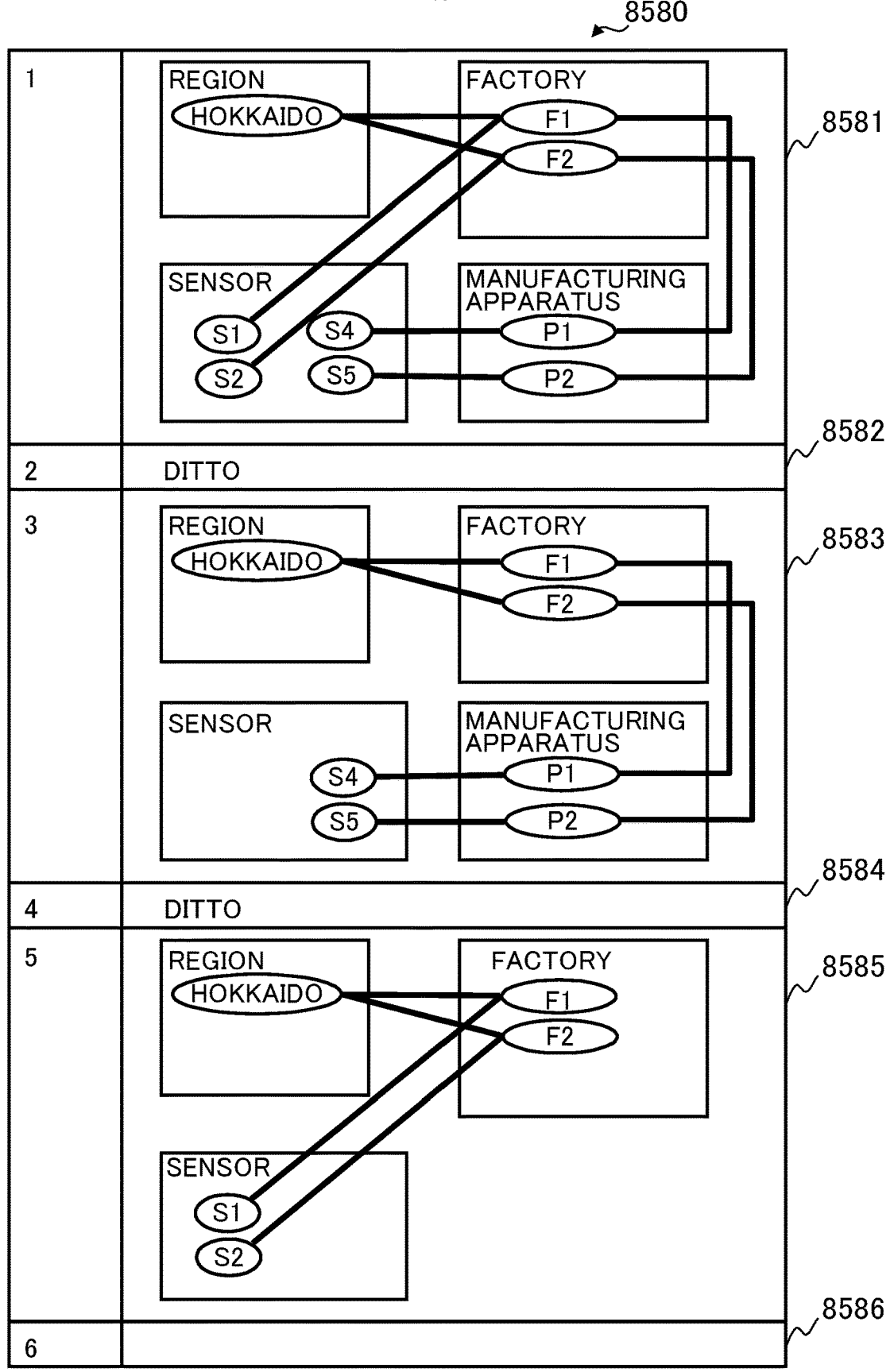
FIG. 12 is a diagram showing the first embodiment of the present invention and showing one example of a screen on which data extracting query candidates are output in a graph format.

FIG. 12 schematically shows one example of a graph format output screen 8580 that is output when the graph buttons 8381 to 8386 in the query join route display 8370 fields are pressed on the data extracting query candidate derivation result output screen 8100. Note that although an example of an input and an output on the screen is explained in the present first embodiment, this is not the sole example. Similar information may be able to be handled from commands, or similar information may be able to be handled as arguments or parameters of an API for executing the program.

On the graph format output screen 8580, information indicating graph nodes and graph edges corresponding to an entry of a corresponding query candidate are output in a graph format. Specifically, by pressing the graph button 8381 on the data extracting query candidate derivation result output screen 8100, graph format information 8581 is output. Likewise, by pressing the graph buttons 8382 to 8386, graph format information 8582 to 8586 is output, respectively.

In the graph format information 8581, information incorporating graph nodes and graph edges derived according to the query candidate is converted from a list representation in a graph database into a graph format and output.

The illustrated example shows an output example in which a "list of sensors in the Hokkaido region" is extracted, using the abovementioned data example as a target. The graph format information 8581 shows information obtained by converting the list format information 8571 into a graph representation. By a user of the client machine 14 referencing an output of a result of conversion, for graph nodes having region attributes with name attributes of Hokkaido, four graph nodes having sensor attributes with name attributes of S1, S2, S4 and S5 are extracted as target nodes, through graph nodes including factory attributes and manufacturing apparatus attributes.

FIG. 13 schematically shows one example of an SQL query conversion result output screen 8560 that is output when the SQL buttons 8361 to 8366 in the query conversion 8360 fields are pressed on the data extracting query candidate derivation result output screen 8100. Note that although an example of an input and an output on the screen is explained in the present first embodiment, this is not the sole example. Similar information may be able to be handled from commands, or similar information may be able to be handled as arguments or parameters of an API for executing the program.

On the SQL query conversion result output screen 8560, based on information corresponding to an entry of a corresponding query candidate, an SQL query for the database control program 1121 on the database server 11 to extract target data is output. Specifically, by pressing the SQL button 8361 on the data extracting query candidate derivation result output screen 8100, an SQL query 8561 is output. Likewise, by pressing the SQL buttons 8382 to 8386, SQL queries corresponding to respective ones are output (illustration thereof is omitted).

FIG. 14 schematically shows one example of configuration information in the evaluation value table 2300. In the evaluation value table 2300, evaluation values designated by a user of the client machine 14 about query candidates are associated and administered. In the evaluation value table 2300, information of record serial numbers 2310, requestor IDs 2320, entity/relation administration table entry IDs 2330 and evaluation values 2340 is stored.

The record serial numbers 2310 are equivalent to record identification numbers in the evaluation value table 2300.

The requestor IDs 2320 store identification information to specify users of the client machine 14 who are requestors of query derivation.

The entity/relation administration table entry IDs 2330 store identification information of targets with which evaluation values are associated. The evaluation values 2340 store evaluation values designated by users of the client machine 14. The final evaluation values used may be a result of detecting all the corresponding records in the evaluation value table 2300 and totaling the corresponding evaluation values, or at the time of registration of a record in the evaluation value table 2300, a total evaluation value may be calculated based on information of prior registered entries every time such registration is performed, and the total evaluation value may be registered as a new evaluation value.

In the evaluation value table 2300, records of the entity conversion table 2100 referenced when query candidates are derived, records of the relation conversion table 2200, ID information for identifying users (user IDs; groups IDs, job IDs or the like), and the evaluation values 2340 designated by users are associated in the evaluation value table 2300. These evaluation values can be used when rank values to be used at the time of result organization (sorting) when a plurality of query candidates are derived are computed at future query candidate derivation.

Figure 15:
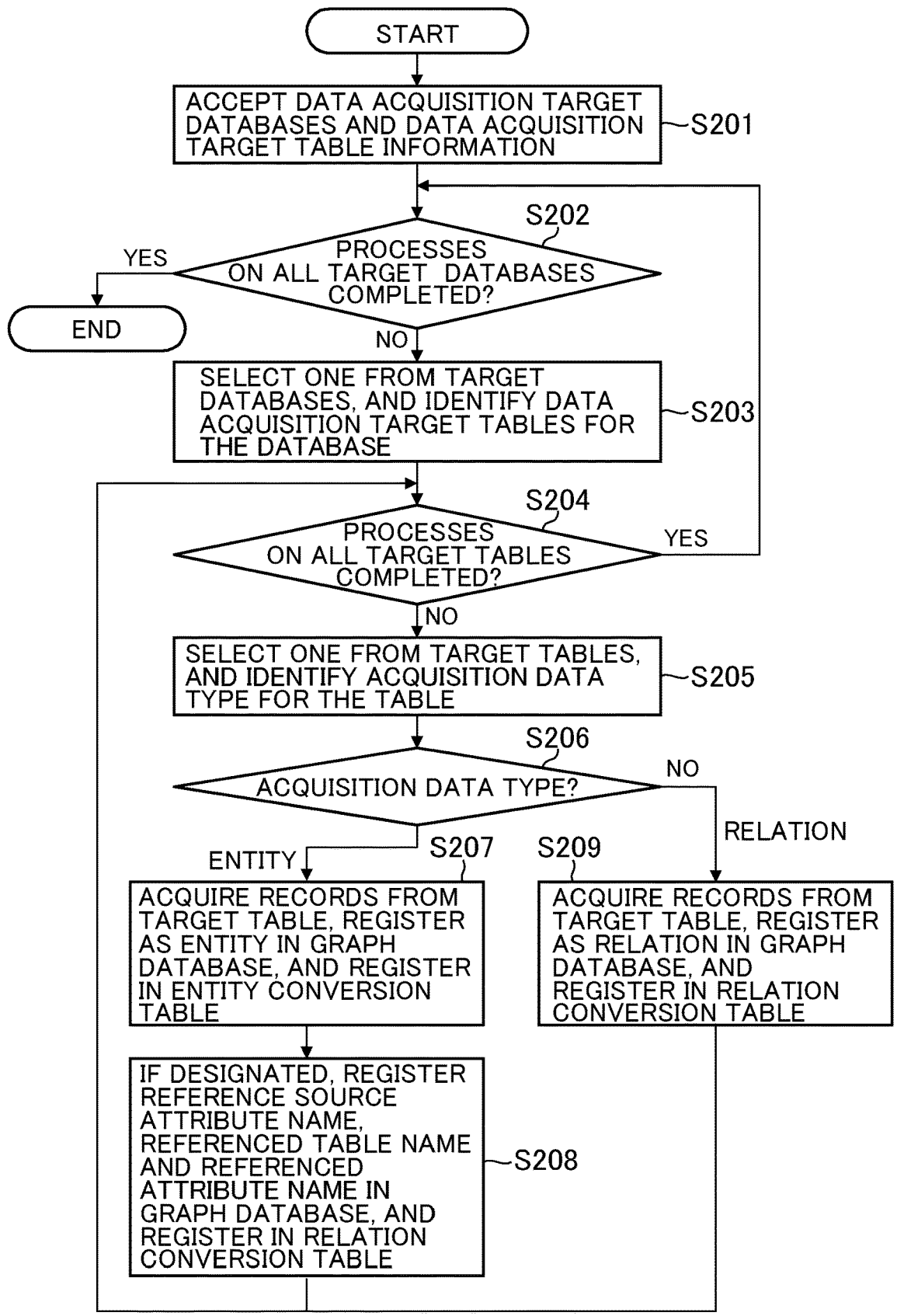
FIG. 15 is a flowchart showing the first embodiment of the present invention and showing one example of a data registration process in the database query deriving server.

FIG. 15 is a flowchart showing one example of a data registration process performed at the database query deriving server 12. The present process is executed when the administration server 13 makes a data registration request to the data registration program 1222 on the database query deriving server 12 through the data registration screen 6100 or the like.

First, at Step S201, the data registration program 1222 accepts data acquisition target databases and data acquisition target table information from the data registration process operation administration program 1322 of the administration server 13. In the present first embodiment, information input on the data registration screen 6100 is handled as accepted information.

Next, at Step S202, the data registration program 1222 lists up the data acquisition target databases and judges whether or not processes mentioned below have been performed on all the data acquisition target databases. If the processes have been performed on all of them, the flowchart ends, and if the processes have been performed on not all of them, the procedure proceeds to Step S203.

At Step S203, the data registration program 1222 selects one from the target databases, and identifies data acquisition target tables for the database. Next, at Step S204, the data registration program 1222 judges whether or not processes mentioned below have been performed on all the data acquisition target tables. If the processes have been performed on all of them, the procedure proceeds to Step S202, and if the processes have been performed on not all of them, the procedure proceeds to Step S205.

At Step S205, the data registration program 1222 selects one from the target tables, and identifies an acquisition data type for the table. Next, at Step S206, according to the data registration program 1222, the processes branch based on the acquisition data type 6330 for the table. If the acquisition data type is "entity administration table 300", the procedure proceeds to Step S207, and if the acquisition data type is "relation administration table 400", the procedure proceeds to Step S209.

At Step S207, the data registration program 1222 acquires records from a target table of the database control program 1121, and registers them as instances of graph nodes in a graph database of the query deriving database control program 1211. In addition, the data registration program 1222 registers information about the table and the graph nodes in the entity conversion table 2100.

Next, at Step S208, if the reference source attribute name 6340, referenced table name 6350 and referenced attribute name 6360 are designated on the data registration screen 6100, the data registration program 1222 registers them as instances of graph edges in the graph database of the query deriving database control program 1121 based on the information.

In addition, the data registration program 1222 registers information about the table group, reference source attribute names and referenced attribute names in the relation conversion table 2200. Upon completion of the process at Step S208, the procedure returns to Step S204 and repeats the abovementioned processes.

At Step S209 which follows a judgement at Step S206 that the acquisition data type is "relation administration table 400", the data registration program 1222 acquires records from a target table of the database control program 1121, and registers them as instances of graph edges in the graph database of the query deriving database control program 1211. In addition, the data registration program 1222 registers information about the table and the graph edges in the relation conversion table 2200.

As a result of the abovementioned processes, the entity conversion table 2100 and relation conversion table 2200 are set based on the accepted information input on the data registration screen 6100.

Figure 16:
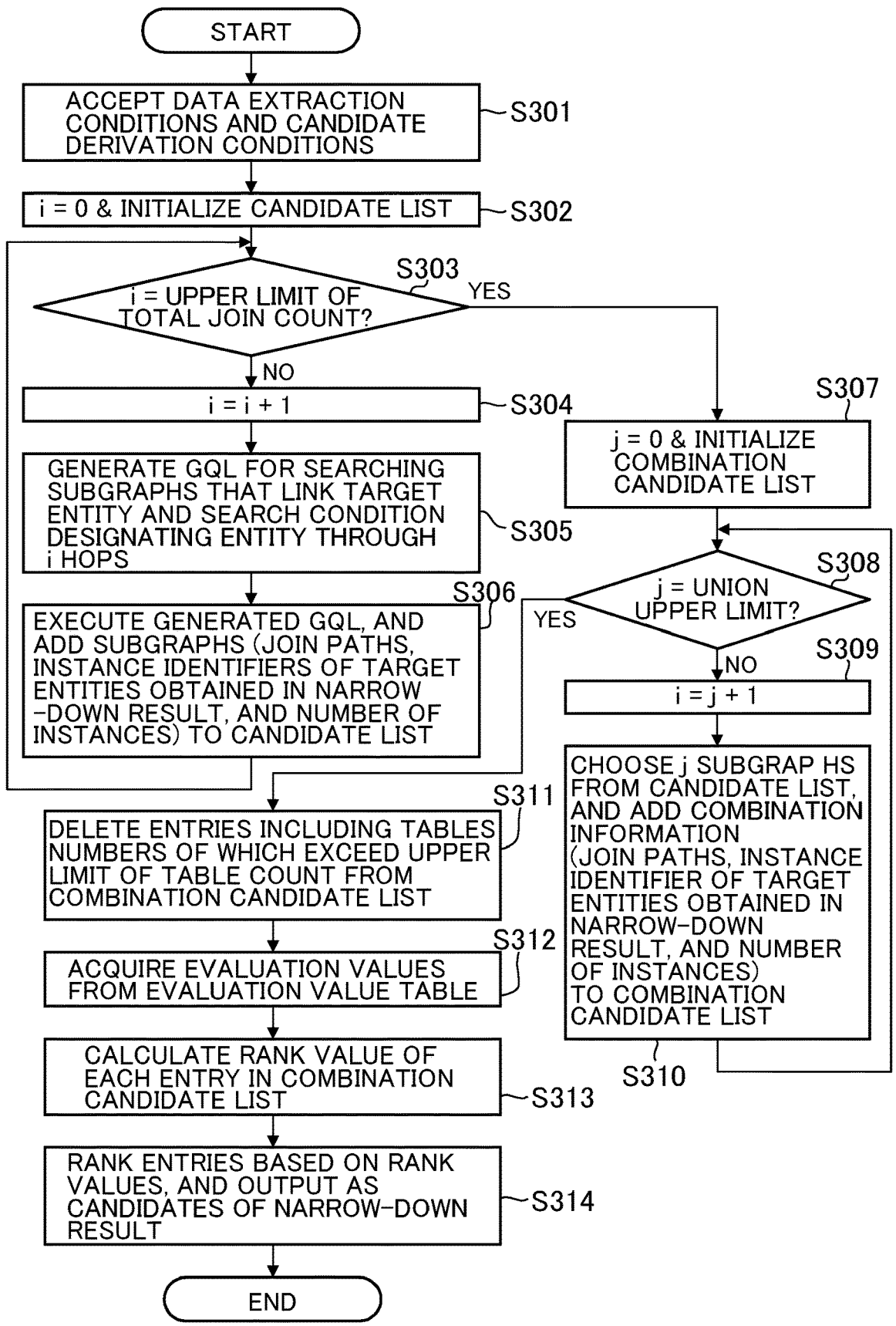
FIG. 16 is a flowchart showing the first embodiment of the present invention and showing one example of a data extracting query candidate derivation process.

FIG. 16 is a flowchart showing one example of a data extracting query candidate derivation process performed at the database query deriving server 12. The present process is executed when the client machine 14 makes a data extracting query candidate derivation request (execute button 7110) to the query candidate deriving program 1223 on the database query deriving server 12 through the data extraction condition input screen 7100 shown in FIG. 9 or the like.

First, at Step S301, the query candidate deriving program 1223 accepts data extraction conditions, candidate derivation conditions and the like from the query deriving client program 1422 of the client machine 14. In the present first embodiment, information input on the data extraction condition input screen 7100 is handled as accepted information.

Next, at Step S302, the query candidate deriving program 1223 initializes the value of a variable i used for judging the upper limit of the total join count (total join count 7520) to 0, and initializes a candidate list (illustration omitted) for temporarily administering a product of the present process. Note that the candidate list can be stored in the memory 1220 or external storage apparatus 1240.

At Step S303, the query candidate deriving program 1223 judges whether or not the value of the variable i has reached the value of the upper limit of the total join count. If the value has reached the upper limit, the procedure proceeds to Step S307, and if the value has not reached the upper limit, the procedure proceeds to Step S304. Note that the upper limit of the total join count (total join count 7520) functions as a narrow-down condition.

At Step S304, the query candidate deriving program 1223 adds 1 to the value of the variable i. Next, at Step S305, the query candidate deriving program 1223 generates a query intended for a graph database (GQL: Graph Query Language) for searching subgraphs that link a target entity (entity name 7210) and a search condition designating entity (entity name 7310) through i hops. Here, the i hops mean that a graph node to serve as a target entity and a graph node to serve as a search condition designating entity are connected by i graph edges.

Next, at Step S306, the query candidate deriving program 1223 causes the generated GQL to be executed at the query deriving database control program 1221, and adds subgraphs to a candidate list. Here, the subgraphs correspond to join paths (routes of graph edges between the graph nodes) obtained with the GQL, identification information of each instance of target entities obtained in a narrow-down result and the number thereof. Upon completion of the process at Step S306, the procedure returns to Step S303 and repeats the abovementioned processes.

On the other hand, at Step S307 which follows a judgement at Step S303 that the variable i has reached the upper limit of the total join count, the query candidate deriving program 1223 initializes the value of a variable j used for judging the upper limit of the total route count (total route count 7530) to 0, and initializes a combination candidate list (illustration omitted) for temporarily administering combinations of products of the present process. Note that the combination candidate list can be stored in the memory 1220 or external storage apparatus 1240. In addition, the upper limit of the total route count (total route count 7530) functions as a narrow-down condition.

At Step S308, the query candidate deriving program 1223 judges whether or not the value of the variable j has reached the value of the upper limit of the total route count. If the value has reached the upper limit, the procedure proceeds to Step S311, and if the value has not reached the upper limit, the procedure proceeds to Step S309.

At Step S309, the query candidate deriving program 1223 adds 1 to the value of the variable j. Next, at Step S310, the query candidate deriving program 1223 chooses j subgraphs from the candidate list, and adds subgraph combination information (join paths, identification information of each instance of target entities obtained in a narrow-down result, and the number thereof) to a combination candidate list.

The query candidate deriving program 1223 repeats this process until all the j combination patterns are covered. Upon completion of the process at Step S310, the procedure returns to Step S308 and repeats the abovementioned processes.

At Step S311, the query candidate deriving program 1223 judges whether or not there are entries including tables the numbers of which exceed the upper limit of a table count (table count 7510) in the combination candidate list, and if there are, deletes the entries. Note that the upper limit of a table count (table count 7510) functions as a narrow-down condition.

Next, at Step S312, the query candidate deriving program 1223 acquires evaluation values from the evaluation value table 2300. Next, at Step S313, the query candidate deriving program 1223 calculates rank values of respective entries in the combination candidate list. A rank value calculation example is described below.

Next, at Step S314, the query candidate deriving program 1223 ranks the entries in the combination candidate list based on the calculated rank values, and outputs the ranked entries as query candidates of a narrow-down result.

As a result of the abovementioned processes, the query candidate deriving program 1223 adds, to the candidate list, subgraphs obtained through a search based on accepted information set on the data extraction condition input screen 7100, and adds, to a combination candidate list, combinations of subgraphs selected from the candidate list. Thereafter, the query candidate deriving program 1223 provides entries of the combination candidate list with the ranking result, and outputs a narrow-down result as query candidates.

FIG. 17 schematically shows one example of the rank value table 2400 used in the data extracting query candidate derivation process. The rank value table 2400 is a table generated when rank values are calculated at the abovementioned Step S313 when the query candidate deriving program 1223 performs the data extracting query candidate derivation process.

In the rank value table 2400, information of entry serial numbers 2410, target entity counts 2420 which are the numbers of target entities which are hits of search conditions, search condition hit ratios 2430, weight values 2440, evaluation values 2450, total join counts 2460, total route counts 2470, table counts 2480, rank values 2490 and ranks 2495 is stored.

In FIG. 17, one example of a result obtained when query candidates are derived with a condition of extracting a "list of sensors in the Hokkaido region" using the abovementioned data example as a target is shown. In this case, an entity administration table name to serve as a target is the sensor table 3400, and a name attribute value in the region table 3100 used as a search condition is Hokkaido (or a region number attribute value in the region table 3100 is 1).

The target entity counts 2420 of target entities that are obtained as hits of the search condition are the numbers of instances of graph nodes to be target entities matching the search condition among the query candidates and derived as a result.

The search condition hit ratios 2430 are calculated by determining the largest value of the target entity counts 2420 of target entities that are obtained as hits of the search condition among the query candidate group, and dividing the target entity counts 2420 of target entities that are obtained as hit of the search condition for the query candidates by the largest value The weight values 2440 store values calculated based on a computation formula to evaluate join routes of the query candidates for the query candidates. For example, an index indicating what percentage of the entire records of two target tables at the time of join (JOIN) the relational definition of records between both the tables covers (inter-table relational definition coverage).

Then, when combining predetermined joins to extract target data, the query candidate deriving program 1223 calculates weight values based on the products of the inter-table relational definition coverages corresponding to those joins, and if target data is extracted using the sum total (UNION) of a plurality of routes obtained by combining predetermined joins, may calculate weight values using the averages of respective weight values of the plurality of routes.

The evaluation values 2450 used are extracted and calculated as evaluation values applicable to target query candidates based on values acquired by the query candidate deriving program 1223 at Step S312. The total join counts 2460 store values calculated as the sum totals of join counts (the numbers of JOIN) based on respective entries registered in the combination candidate list generated by the query candidate deriving program 1223 up to Step S311.

The total route counts 2470 store numbers calculated as the sum totals of route counts (the numbers of UNION) based on respective entries registered in the combination candidate list generated by the query candidate deriving program 1223 up to S311.

The rank values 2490 store values calculated according to a rank value formula by the query candidate deriving program 1223 from the abovementioned information in the rank value table 2400. This rank value formula may be modified as appropriate based on conditions designated in the ranking method 7600 on the data extraction condition input screen 7100. For example, if only the evaluation values 2450 are used, these values may be used directly.

In the present first embodiment shown, rank values are calculated according to the priority shown next, using five values shown next as targets. Here, the sum of two values of a weight value 2440 and an evaluation value 2450 is used as the first priority, a search condition hit ratio 2430 is used as the second priority, the reciprocal of a total join count 2460 is used as the third priority, the reciprocal of a total route count 2470 is used as the fourth priority, and the reciprocal of a table count 2480 is used as the fifth priority. An example of a calculation formula in this case can be like the one shown as (Formula 1).

Rank value=$p1$*(the sum of two values of a weight value 2440 and an evaluation value 2450)+$p2$*(search condition hit ratio 2430)+$p3$*(the reciprocal of a total join count 2460)+$p4$*(the reciprocal of a total route count 2470)+$p5$ (the reciprocal of a table count 2480)

where $p1=10000$, $p2=1000$, $p3=100$, $p4=10$ and $p5=1$  (Formula 1)

The rank value formula may be registered in advance according to variations that are assumed in advance or may be additionally registered by an administrator during operation. In addition, it may be made possible to set in advance and modify during operation also the values of coefficients set (in the case of (Formula 1), p1 to p5) as a part of adjustment.

Last, the ranks 2495 are values provided by organizing the values of the rank values 2490 in a predetermined order. In the present first embodiment shown, the values of the ranks are ranks of the rank values when they are organized in the descending sequence.

Figure 18:
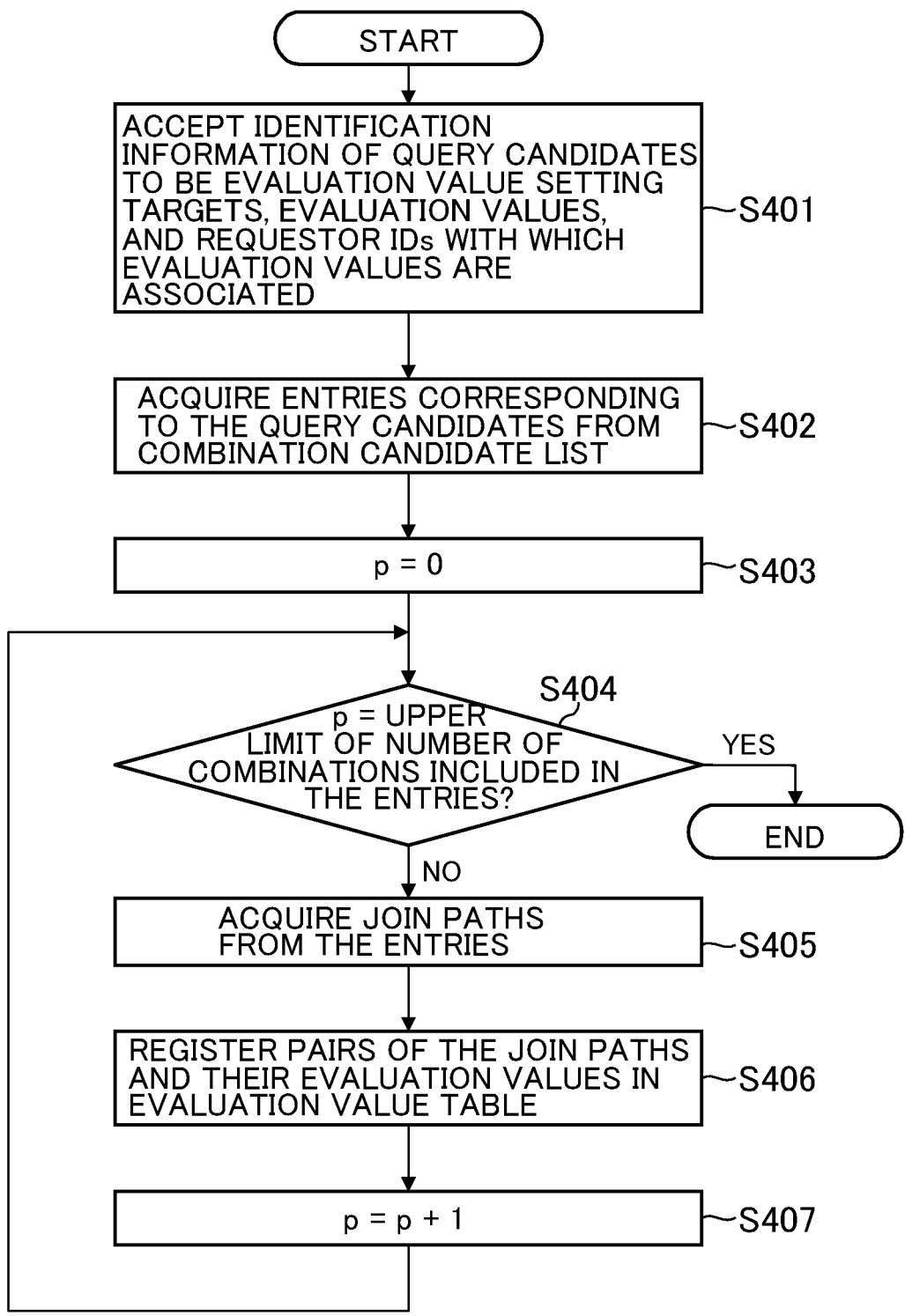
FIG. 18 is a flowchart showing the first embodiment of the present invention and showing one example of a process of registering values of evaluation of data extracting query candidates by a user.

FIG. 18 is a flowchart showing one example of a process of registering values of evaluation by a user for data extracting query candidates performed at the database query deriving server 12. The present process is executed when the client machine 14 makes an evaluation value registration request to the query candidate evaluation value administration program 1224 on the database query deriving server 12 through the data extracting query candidate derivation result output screen 8100 shown in FIG. 10 or the like.

First, at Step S401, the query candidate evaluation value administration program 1224 accepts, from the client machine 14, identification information of query candidates to serve as evaluation value setting targets, evaluation values, and requestor IDs with which the evaluation values are associated. Here, this is executed being triggered by the target information being input on the data extracting query candidate derivation result output screen 8100 of the client machine 14 and the evaluation value registration button 8400 being pressed.

Next, at Step S402, the query candidate evaluation value administration program 1224 acquires, from a combination candidate list generated by the query candidate deriving program 1223, entries corresponding to the queries (information of subgraphs corresponding to query candidates).

Specifically, an entry including subgraphs which are the same as those for the entry is searched, and the number of the combinations is acquired. Next, at Step S403, the query candidate evaluation value administration program 1224 initializes, to 0, the value of a variable p used for judging the upper limit (total route count 7530) of the number of combinations of subgraphs included in matching entries of the combination candidate list.

At Step S404, the query candidate evaluation value administration program 1224 judges whether or not the value of the variable p has reached the upper limit of the number of combinations of the subgraphs included in the entries of the combination candidate list. If the value has reached the upper limit, the present process ends. If the value has not reached the upper limit, the procedure proceeds to Step S405.

At Step S405, the query candidate evaluation value administration program 1224 acquires join paths corresponding to subgraphs from the entries. Next, at Step S406, the query candidate evaluation value administration program 1224 registers pairs of the join paths and their evaluation values in the evaluation value table 2300.

Here, if a matching entry (an entry for which the requestor ID is the same and an entry ID in an entity administration table 300 or relation administration table 400 corresponding to a join path is the same) is already registered in the evaluation value table 2300, the query candidate evaluation value administration program 1224 overwrites and updates the entry, or adds a new entry. If a matching entry is not registered in the evaluation value table 2300, the query candidate evaluation value administration program 1224 adds a new entry.

Next, at Step S407, the query candidate evaluation value administration program 1224 adds 1 to the value of the variable p. Upon completion of the process at Step S407, the procedure returns to Step S404 and repeats the abovementioned processes.

As a result of the abovementioned processes, a combination of a join path and an evaluation value for a query candidate to serve as an evaluation value setting target is registered in the evaluation value table 2300.

Figure 19:
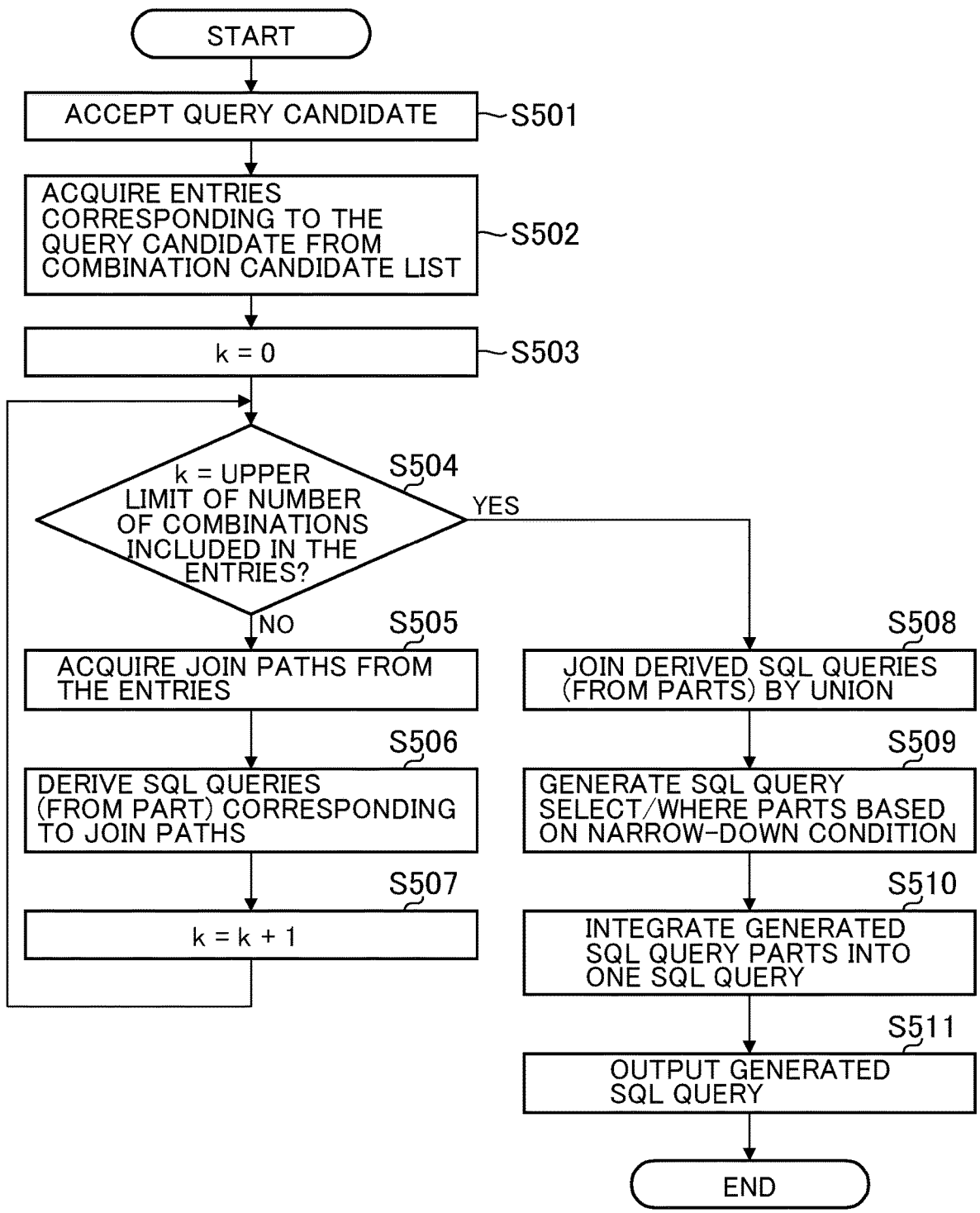
FIG. 19 is a flowchart showing the first embodiment of the present invention and showing one example of SQL query conversion processing about data extracting query candidates.

FIG. 19 is a flowchart showing one example of SQL query conversion processing on data extracting query candidates performed at the database query deriving server 12. The present process is executed when the client machine 14 makes a request for conversion into an SQL query to the query conversion program 1225 on the database query deriving server 12 through the data extracting query candidate derivation result output screen 8100 or the like.

First, at Step S501, the query conversion program 1225 accepts a query candidate to serve as a conversion target. In the present first embodiment, this process is executed triggered by a desired one being selected from query candidates displayed on the data extracting query candidate derivation result output screen 8100 shown in FIG. 10 and a corresponding button among the SQL buttons 8361 to 8366 being pressed.

Next, at Step S502, the query conversion program 1225 acquires, from a combination candidate list, entries corresponding to the query candidate (information of subgraphs corresponding to the query candidate). Next, at Step S503, the query conversion program 1225 initializes, to 0, the value of a variable k used for judging the upper limit (total route count 7530) of the number of combinations of subgraphs included in matching entries in a combination candidate list.

At S504, the query conversion program 1225 judges whether or not the value of the variable k has reached the upper limit of the number of combinations of subgraphs included in the entries of the combination candidate list. If the value has reached the upper limit, the procedure proceeds to Step S508, and if the value has not reached the upper limit, the procedure proceeds to Step S505.

At Step S505, the query conversion program 1225 acquires, from the entries, join paths corresponding to predetermined subgraphs.

Next, at Step S506, the query conversion program 1225 derives FROM parts of SQL queries corresponding to the join paths. In the present first embodiment, tables of matching entries registered in the entity conversion table 2100 are listed up, and those tables are joined based on data of the first table names 2240, second table names 2250 and join conditions 2260 of the matching entries registered in the relation conversion table 2200; thereby, derivation of FROM parts is handled. Next, at Step S507, the query conversion program 1225 adds 1 to the value of the variable k. Upon completion of the process at Step S507, the procedure returns to Step S504 and repeats the abovementioned processes.

At Step S508, if a plurality of combination candidates are listed up for FROM parts of an SQL query derived in a preceding process, the query conversion program 1225 joins them by UNION.

Next, at Step S509, the query conversion program 1225 generates SQL query SELECT parts and WHERE parts based on data extraction conditions. Specifically, SELECT parts are generated based on information designated in respective fields of the extraction target 7200 in FIG. 10, and WHERE parts are generated based on information designated in the search condition 7300 and extraction period 7400.

At Step S510, the query conversion program 1225 integrates a generated SQL query part group into one SQL query. In the present first embodiment, the query conversion program 1225 integrates parts of the abovementioned SELECT parts, FROM parts and WHERE parts to generate one SQL query. Last, the query conversion program 1225 outputs the generated SQL query.

As mentioned above, in the present first embodiment, the database query deriving server 12 has the following functions: the function of extracting data which can be joined in SQL as graph data based on the entity administration tables 300 and relation administration tables 400; the function of accepting data extraction conditions and candidate derivation conditions and narrowing down candidates of subgraphs of graph data (query candidates); the function of outputting, to the client machine 14, information obtained by providing rank values to a result of narrow-down (query candidates) and organizing the result; the function of accepting, from the narrow-down result, the candidates of the subgraphs to be converted into a query as query candidates; and the function of deriving SQL FROM parts corresponding to join path from the subgraphs corresponding to the query candidates and generating SQL. Note that the function of generating SQL further includes the function of joining SQL FROM parts by UNION and generating SELECT parts and WHERE parts from data extraction conditions and candidate derivation conditions.

According to the abovementioned configuration, in the present first embodiment, it becomes possible to derive a query which can be joined and gives non-zero pieces of data even if joined, based on graph data which can be joined.

In addition, it becomes possible for a user of the client machine 14 to easily select a query candidate by providing a result obtained by organizing query candidates which are a narrow-down result based on ranking scores about the query candidates. Furthermore, it becomes possible to further refine a narrow-down result of query candidates by reflecting, in the ranking scores, evaluation value designated by a user for query derivation candidates which are a narrow-down result.

Second Embodiment

In the computer system 1 of the abovementioned first embodiment, the database query deriving server 12 derives an SQL query, and executes the query on the database server 11 to acquire target data.

Nevertheless, in the computer system 1 of the abovementioned first embodiment, if the amount of data acquired with the derived SQL query is large, overheads of an I/O process accompanying the acquisition and a transfer process of the network 10 might occur. In this case, response time and/or throughput until acquisition of target data become long and large, and there is a concern about lowering of convenience.

In view of this, in the computer system 1 in the second embodiment, when an SQL query is derived in the database query deriving server 12, the derived SQL query is transferred to and executed at the database server 11 in synchronization with the derivation, and this enables caching on the memory 1120 in the database server 11.

The second embodiment is different from the abovementioned first embodiment in that: a step of acquiring and caching target data at earlier timing in the overall sequence until data acquisition is added; buttons not only for SQL conversion but also for caching are added on the data extracting query candidate derivation result output screen 8100; and a cache acquisition request is newly added after query conversion in the SQL query conversion processing. Note that the other configurations are the same as those in the first embodiment.

Hereinafter, modified portions of a sequence diagram showing a series of processes related to data extracting query generation in the second embodiment are explained with reference to FIG. 20, modified portions of the data extracting query candidate derivation result output screens 8100 are explained with reference to FIG. 21, and modified portions of the flow of SQL query conversion processing are explained with reference to FIG. 22.

Figure 20:
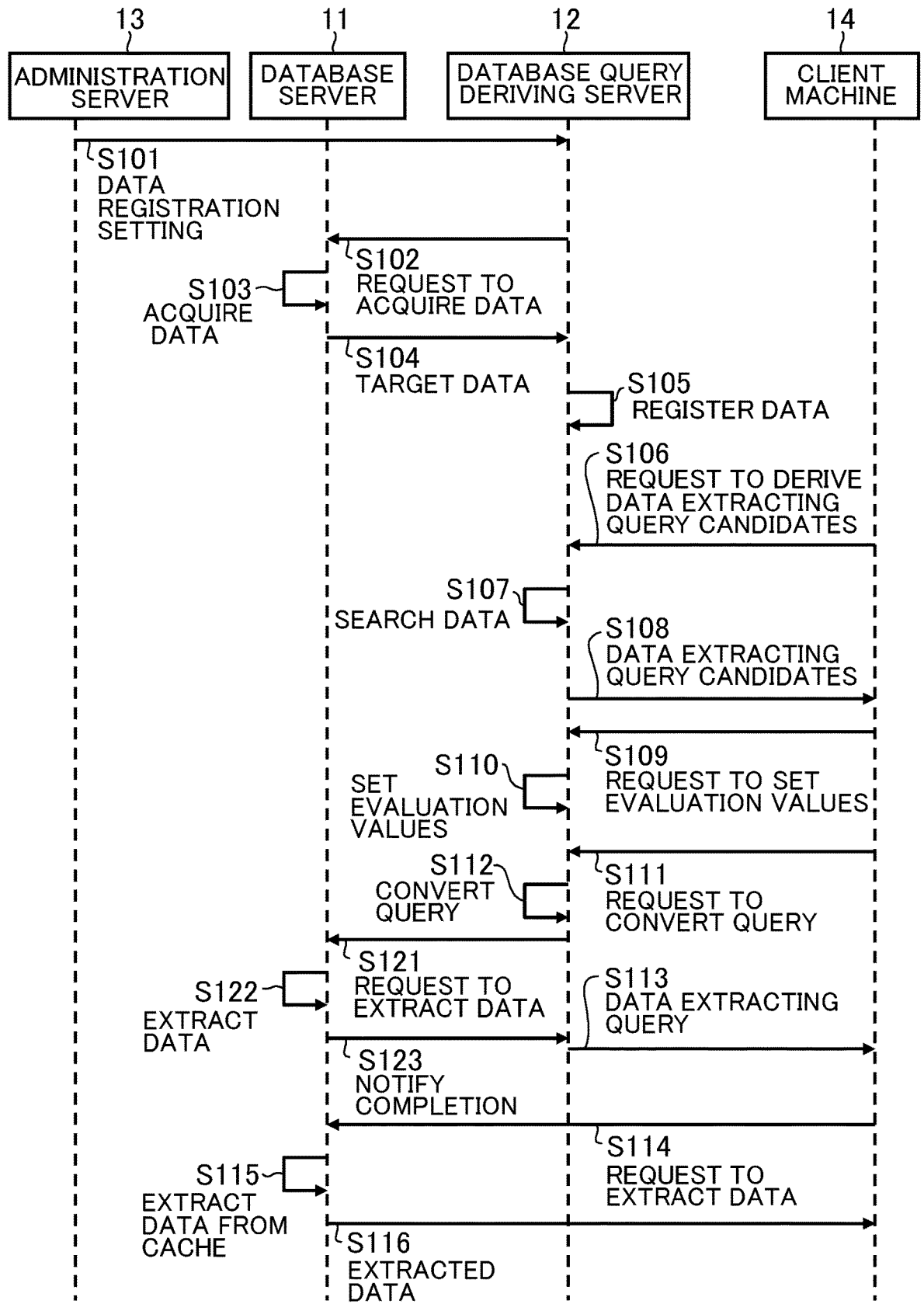
FIG. 20 is a sequence diagram showing a second embodiment of the present invention and showing a series of processes related to data extracting query generation.

FIG. 20 is a sequence diagram showing a series of processes related to data extracting query generation in the second embodiment. Differences from FIG. 2 shown in the first embodiment are that Steps S121 to S123 are added after Step S112, and that the content of the process at Step S115 is modified. Hereinafter, these modified points are mainly explained.

After performing Step S112, at Step S121, the query conversion program 1225 transmits the derived SQL query to the database control program 1121 on the database server 11, and requests to extract target data on a cache (illustration omitted) preset in the memory 1220 of the database server 11.

At Step S122, the database control program 1121 executes the received SQL query, and stores data acquired from the external storage apparatus 1140 on the cache memory. Note that this cache memory may be located on the database server 11 or may be located on another server or machine.

Next, at Step S123, the database control program 1121 notifies the database query deriving server 12 of completion of the process. The query conversion program 1225 of the database query deriving server 12 may be configured to execute the next Step S113 after waiting for completion notification at Step S123 or may be configured to execute the next Step S113 without waiting for the completion notification.

In addition, at S115, for data for which a data extraction request is accepted, the database control program 1121 may be configured to provide data acquired on the cache memory in a preceding step, instead of executing the query and acquiring data.

As a result of the abovementioned processes, by reading in data cached in the cache memory at the database server 11, an overhead of a data transfer process can be reduced as compared with reading in data from the external storage apparatus 1140.

FIG. 21 is a drawing schematically showing the data extracting query candidate derivation result output screen 8100 in the second embodiment. A difference from FIG. 10 shown in the first embodiment is that SQL+cache buttons 8391 to 8396 are added to the query conversion fields 8360. Hereinafter, this modified point is mainly explained. Note that the other configurations are the same as those in the first embodiment.

The SQL+cache buttons 8391 to 8396 execute conversion into an SQL query using a query candidate of a corresponding entry as a target and read-out of acquired data into the cache memory By pressing the SQL+cache buttons 8391 to 8396, the flowchart explained with reference to FIG. 20 is executed. Note that although in the present second embodiment, the SQL+cache buttons are provided separately from the SQL buttons, this is not the sole example. In a configuration, when the SQL buttons explained first are pressed, read-out of acquired data into the cache memory may be executed.

Figure 22:
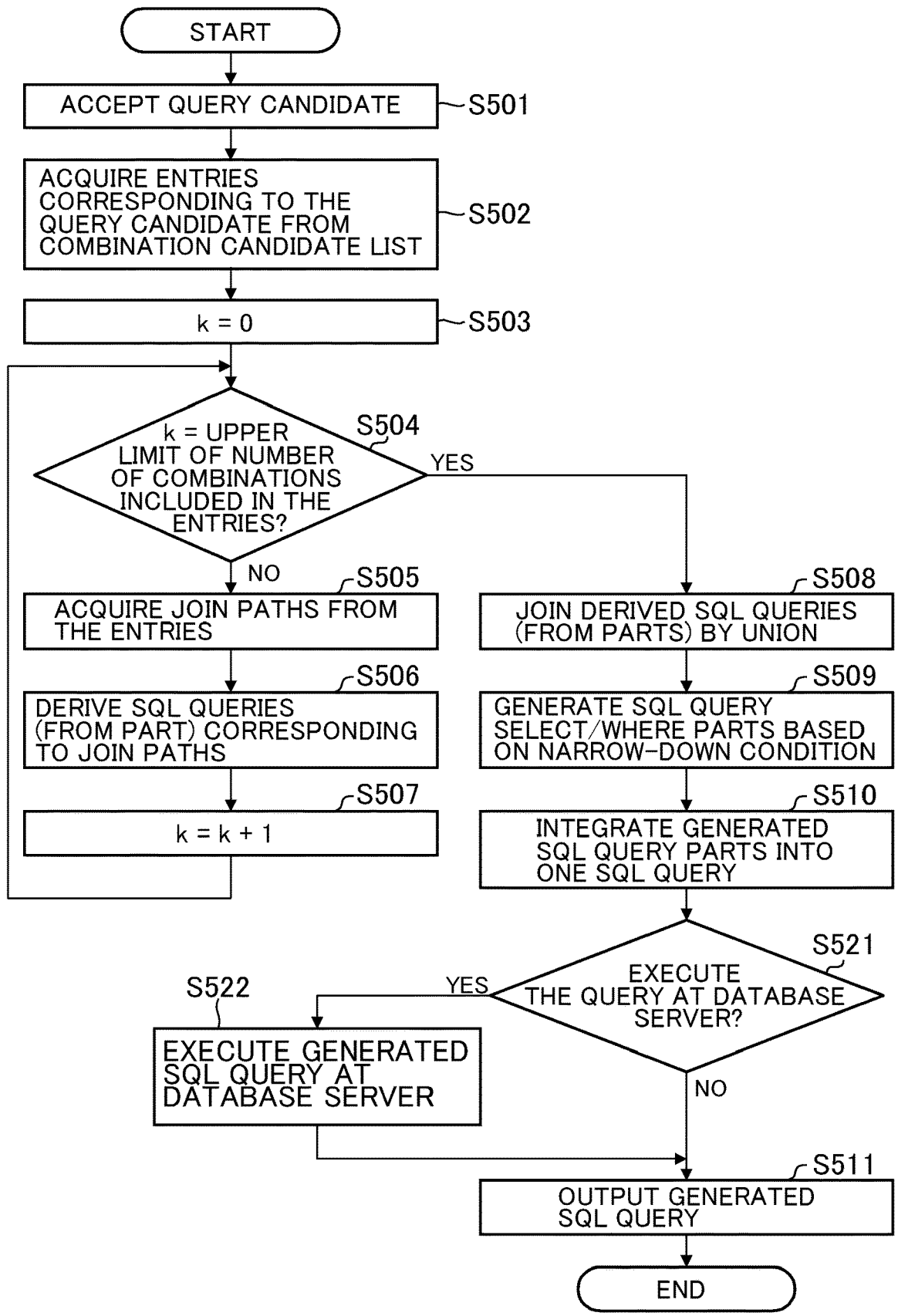
FIG. 22 is a flowchart showing the second embodiment of the present invention and showing one example of SQL query conversion processing.

FIG. 22 is a flowchart showing one example of SQL query conversion processing on data extracting query candidates performed at the database query deriving server 12 in the second embodiment. A difference from the process of FIG. 19 shown in the first embodiment is that S521 and S522 are added after S510. The other configurations are the same as those in FIG. 19 of the first embodiment. Hereinafter, these modified points are mainly explained.

After performing Step S510 in a similar manner to FIG. 19, at Step S521, the query conversion program 1125 judges whether or not to execute a derived SQL query at the database server 11. In the present second embodiment, if any of the SQL+cache buttons 8391 to 8396 is pressed on the data extracting query candidate derivation result output screen 8100, it is judged that the SQL query is to be executed at the database server 11, and the procedure proceeds to Step S522. On the other hand, if an SQL button is pressed, it is judged that the SQL query is not to be executed at the database server 11, and the procedure proceeds to Step S511.

At Step S522, the query conversion program 1125 demands the database control program 1121 on the database server 11 to execute the SQL query, and the database control program. 1121 that has been demanded to do so executes the designated SQL query and stores acquired data on a cache memory. Upon completion of the process of Step S522, the database control program 1121 notifies a requestor of the completion. After receiving the completion notification, the query conversion program 1225 of the database query deriving server 12 which is the requestor executes the next Step S511 in a similar manner to the first embodiment. Note that the query conversion program 1225 may be configured to execute the next S511 before receiving the completion notification.

As a result of the process explained above, in the present second embodiment, the database server 11 stores data with a designated query in a cache memory, and upon accepting a data extraction request from the client machine 14, the database server 11 reads in corresponding data from the cache memory. Thereby, according to the present second embodiment, in addition to the first embodiment, it is possible to suppress deterioration of response time and/or throughput until acquisition of data.

Note that although in the abovementioned first and second embodiments shown, the present invention is applied to SQL, this is not the sole example, and the present invention may be applied for example to NoSQL. In addition, although in the abovementioned first and second embodiments shown, the present invention is applied to a relational database, this is not the sole example, and the present invention may be applied for example to Hbase on an HDFS (Hadoop Distributed File System) or the like.

Note that the present invention is not limited to the abovementioned embodiments, but also includes various variants. For example, the abovementioned embodiments are described in detail in order to explain the present invention in an easy-to-understand manner and the present invention is not necessarily limited to those including all the explained configurations. In addition, a part of the configuration of an embodiment may be replaced with a configuration of another embodiment, and a configuration of an embodiment may be added to a configuration of another embodiment. In addition, a part of the configuration of each embodiment may be subjected to one of or a combination of addition of, deletion of or replacement with another configuration.

In addition, the abovementioned respective configurations, functions, processing units, processing means and the like may be partially or entirely realized by hardware by designing them for example in an integrated circuit and so on. In addition, the abovementioned respective configurations, functions and the like may be realized by software by processors interpreting and executing programs to realize the respective functions. Information such as programs, tables or files to realize the respective functions may be placed in memories, recording apparatuses such as hard disk drives or SSDs (Solid State Drives), or recording media such as IC cards, SD cards or DVDs.

In addition, control lines and/or information lines shown are those that are thought to be necessary for explanation, and all the control lines and/or information lines that are necessary for realizing products are not necessarily shown. Actually, almost all the configurations may be considered as being connected mutually.

What is claimed is:

1. A query generation assist apparatus for assisting generation of a query to extract data from a database, the apparatus comprising:
  a memory;
  an input/output device; and
  a processor communicatively coupled to the memory and the input/output device, wherein the processor is configured to
  accept a condition of extracting data to be acquired from the database as a data extraction condition,
  extract, as graph data, data which can be joined in data of the database,
  extract subgraphs based on the data extraction condition from the graph data,
  set a value to a predetermined number, the value corresponding to an upper limit of a number of combinations of the subgraphs included in matching entries in the data extraction condition,
  determine if the value is equal to the upper limit,
  when the value is equal to the upper limit, combine a plurality of subgraphs, generate query candidates based on data extraction conditions, integrate the query candidates into a group of candidates, determine if the group of candidates should be executed at the database, when the groups of candidates are executed at the database, the acquired data is saved in the database and the processor receives a competition message, and calculate rank values of the query candidates and output the query candidates ranked according to the rank values.

2. The query generation assist apparatus according to claim 1, wherein the processor accepts an other query candidate which is a conversion target and not in the query candidates generated, and generates a query based on a correspondence between the other query candidate and the subgraphs.

3. The query generation assist apparatus according to claim 1, wherein the processor accepts a candidate derivation condition including at least one of a table count, a data join count and a count of table-joining routes, in addition to the data extraction condition, extracts subgraphs satisfying the candidate derivation condition, and outputs as a narrow-down result the subgraphs satisfying the candidate derivation condition.

4. The query generation assist apparatus according to claim 1, wherein the processor accepts a candidate derivation condition including at least one of a table count, a data join count and a count of table-joining routes, in addition to the data extraction condition, and the processor calculates the rank values from at least one of the table count, the data join count and the count of table-joining routes.

\* \* \* \* \*